US008648860B2

(12) United States Patent
Vrba et al.

(10) Patent No.: US 8,648,860 B2
(45) Date of Patent: Feb. 11, 2014

(54) GRAPHICS TOOLS FOR INTERACTIVE ANALYSIS OF THREE-DIMENSIONAL MACHINE DATA

(75) Inventors: Joseph A. Vrba, Clinton, TN (US); Kai T. Bouse, Tellico Plains, TN (US); Anthony J. Hayzen, Knoxville, TN (US)

(73) Assignee: CSI Technology, Inc., Wilmington, DE (US)

( * ) Notice: Subject to any disclaimer, the term of this patent is extended or adjusted under 35 U.S.C. 154(b) by 1595 days.

(21) Appl. No.: 11/834,249

(22) Filed: Aug. 6, 2007

(65) Prior Publication Data

US 2009/0044181 A1    Feb. 12, 2009

(51) Int. Cl.
*G06T 11/20* (2006.01)

(52) U.S. Cl.
USPC .......................................................... 345/440

(58) Field of Classification Search
USPC .......................................................... 345/440
See application file for complete search history.

(56) References Cited

U.S. PATENT DOCUMENTS

| | | | | |
|---|---|---|---|---|
| 4,435,770 A | * | 3/1984 | Shiohata et al. | 702/56 |
| 4,980,844 A | | 12/1990 | Demjanenko et al. | |
| 5,019,760 A | * | 5/1991 | Chu et al. | 318/490 |
| 5,091,858 A | * | 2/1992 | Paielli | 701/115 |
| 5,130,951 A | | 7/1992 | Kingman | |
| 5,151,882 A | | 9/1992 | Kingman | |
| 5,206,816 A | | 4/1993 | Hill et al. | |
| 5,251,151 A | | 10/1993 | Demjanenko et al. | |
| 5,303,203 A | | 4/1994 | Kingman | |
| RE34,663 E | | 7/1994 | Seale | |
| 5,345,544 A | * | 9/1994 | Iwasaki et al. | 345/440 |
| 5,412,989 A | | 5/1995 | Ederle et al. | |
| 5,555,354 A | * | 9/1996 | Strasnick et al. | 345/427 |
| 5,663,894 A | * | 9/1997 | Seth et al. | 702/56 |
| 5,664,077 A | * | 9/1997 | Kubo | 345/421 |
| 5,721,710 A | | 2/1998 | Sallas et al. | |
| 5,848,425 A | * | 12/1998 | Lowry et al. | 715/205 |
| 5,917,500 A | * | 6/1999 | Johnson et al. | 345/440 |
| 5,999,165 A | * | 12/1999 | Matsumoto | 345/157 |
| 6,022,005 A | | 2/2000 | Gran et al. | |
| 6,041,287 A | * | 3/2000 | Dister et al. | 702/182 |
| 6,289,735 B1 | * | 9/2001 | Dister et al. | 73/579 |
| 6,297,742 B1 | * | 10/2001 | Canada et al. | 340/635 |
| 6,301,572 B1 | * | 10/2001 | Harrison | 706/52 |
| 6,499,002 B1 | | 12/2002 | Lancaster | |
| 6,505,143 B1 | | 1/2003 | Lakshminarasimha et al. | |

(Continued)

OTHER PUBLICATIONS

Sudmersen et al., Transient Vibration Signature Analysis at Steam and Gas Turbines, ECNDT 2006, pp. 1-12.*

(Continued)

*Primary Examiner* — M Good Johnson
(74) *Attorney, Agent, or Firm* — Luedeka Neely Group, P.C.

(57) ABSTRACT

Methods for displaying machine data are described including a method for displaying machine data as a virtual three-dimensional image showing a three-dimensional graph having three axes such that the data in the graph may be rotated about one or more of the axes to give a data analyst a better perspective of the behavior of an item being monitored. In a related embodiment, a method for displaying machine data in a virtual three-dimensional image such that the data may be rotated one or more of the axes is described which further includes one or more cursor images representing substantially planar cursors on the display for analyzing data.

15 Claims, 22 Drawing Sheets

(56) References Cited

U.S. PATENT DOCUMENTS

| | | | |
|---|---|---|---|
| 6,549,869 B1* | 4/2003 | Piety et al. | 702/122 |
| 6,694,285 B1* | 2/2004 | Choe et al. | 702/182 |
| 6,701,286 B2* | 3/2004 | Kauppila | 702/188 |
| 6,707,454 B1* | 3/2004 | Barg et al. | 345/440 |
| 6,750,864 B1* | 6/2004 | Anwar | 345/440 |
| 6,845,340 B2 | 1/2005 | Edie et al. | |
| 6,868,363 B2 | 3/2005 | Baran et al. | |
| 6,907,383 B2* | 6/2005 | Eryurek et al. | 702/183 |
| 6,915,235 B2* | 7/2005 | Reeves et al. | 702/182 |
| 7,032,689 B2 | 4/2006 | Goldman et al. | |
| 7,100,463 B2 | 9/2006 | Boudreaux | |
| 7,231,303 B2* | 6/2007 | Griessler et al. | 702/34 |
| 7,250,951 B1* | 7/2007 | Hurley et al. | 345/440 |
| 7,254,518 B2* | 8/2007 | Eryurek et al. | 702/183 |
| 7,627,441 B2* | 12/2009 | Longsdorf et al. | 702/56 |
| 7,725,274 B2* | 5/2010 | Slemp et al. | 702/56 |
| 2002/0133288 A1* | 9/2002 | Minami et al. | 701/114 |
| 2002/0174293 A1* | 11/2002 | Fox et al. | 711/111 |
| 2004/0041846 A1* | 3/2004 | Hurley et al. | 345/848 |
| 2005/0041026 A1* | 2/2005 | Haynes | 345/440 |
| 2005/0049834 A1 | 3/2005 | Bottomfield | |
| 2005/0077845 A1* | 4/2005 | Olgac et al. | 318/34 |
| 2005/0155429 A1* | 7/2005 | Griessler et al. | 73/593 |
| 2005/0195194 A1* | 9/2005 | Cummings | 345/440 |
| 2005/0278127 A1 | 12/2005 | Griffin et al. | |
| 2006/0059065 A1* | 3/2006 | Glinberg et al. | 705/35 |

OTHER PUBLICATIONS

Cupido et al., Multipoint Laser Doppler Vibrometer for Transient Analysis, Proceedings of IMAC XXI, ACM 2003, pp. 1-6.*

Laggan, Vibration Monitoring, IEEE, Apr. 1999, pp. 3/1-3/11.*

Wachel et al., Analysis of Torsional Vibrations in Rotating Machinery, Proceedings of the Twenty-Second Turbomachinery Symposium, 1993, pp. 127-151.*

Koo et al., The development of reactor coolant pump vibration monitoring and a diganostic system in the nuclear power plant, ISA Transaction 2000, p. 309-316.*

* cited by examiner

GRAPHICS TOOLS FOR INTERACTIVE ANALYSIS OF THREE-DIMENSIONAL MACHINE DATA

FIELD

This invention relates to the field of machine performance analysis. More particularly, this invention relates to displays for enhancing the ability of a user to analyze machine data.

BACKGROUND AND SUMMARY

In accordance with one embodiment, a method is provided for displaying machine data to enhance the user's ability to analyze the machine data. A three dimensional graph of machine data is displayed and a cursor is also displayed in the graph in the form of one or more planes cutting through the three dimensional machine data. A user provides commands through an input device such as a mouse, button, or touch screen, and the cursor moves to different positions corresponding to the inputs provided by a user. Information corresponding to the machine data at the position of the cursor is displayed on or proximate to the graph so that a user may position the cursor at a point of interest on the machine data and read information corresponding to the machine data at such point of interest.

In accordance with a more particular embodiment, the cursor is one or more semi-transparent planes that are positioned over the machine data to partially obscure a portion of the data. The machine data that is behind the plane(s) is still visible, but it is dimmed out to some extent by the cursor. For example, if the cursor were a semi-transparent gray plane, the machine data in front of the plane would be visible as usual, but the data behind the plane would be grayed out a bit as if the data were in a shadow or were being viewed through gray tinted glass. When more than one plane is displayed, the user may move each independently to indicate locations in different dimensions of the machine data. Alternately, secondary and tertiary dimensions can be indicated by highlighting data sets or by drawing a line or other symbol to indicate selection of points within the data. These alternate indicators can also move independently in their respective data dimensions.

In certain applications, multiple cursors can take the form of multiple planar cursors. For example harmonic cursors include a plurality of parallel semi-transparent plane cursors spaced apart equidistantly along a substantially horizontal axis which represents frequency. Thus each semi-transparent planar cursor would be spaced apart from the other semi-transparent planar cursors by the same distance representing the same frequency. By user inputs the user may change the distance between each planar cursor, or move all of the planar cursors at one time left or right along the horizontal axis holding their respective spacing constant. By providing user input commands, the user may select one or more data points using these cursors, and the data displayed on or proximate to the graph will correspond to the selected data point. The displayed data may also include the distance between each planar cursor, and in the case of the horizontal axis representing frequency, the distance between the planar cursors is a measurement of frequency.

A user may also enter commands to create multiple planar cursors that are not a harmonic cursor and in such case the planar cursors may be positioned independently such that the distances between the cursors are not necessarily the same.

The machine data may be vibration spectra where the horizontal axis represents frequency, a substantially vertical axis represents some type of magnitude (e.g., displacement, velocity, or acceleration) and an axis defining depth (the depth axis) represents time or rotation rate. Along the depth axis different spectra obtained at different times or rotations are displayed.

In one embodiment, the three dimensional graph of data is movably displayed and the user may move the graph in a virtual three-dimensional space. For example the user may move the graph so as to rotate it about a substantially vertical axis and thereby view the graph from an infinite number of horizontal views. The user may also move the graph in a rotational motion around a substantially horizontal axis and an axis representing depth (the depth axis). In this manner a user may view the graph from any angle in virtual three-dimensional space. Also, in one embodiment a user may change the position of a user's virtual viewpoint so as to enable a user to analyze the graph from within the virtual three-dimensional space where the data is displayed. By changing the viewpoint and rotating the graph about three axes as described above, a user may view the graph from any position and orientation.

The above-described movable three-dimensional graph is implemented on a device, such as a computer, capable of three-dimensional graphing. In one embodiment four slide bars are provided on the screen, one for each of the three axes and one for the viewpoint. To change the angle of view in any of the three directions, or to change the viewpoint, a user may use a mouse, keyboard or other input device to move the slide bars and thereby change the orientation angle or viewpoint. In another embodiment, a three-dimensional input device such as a track ball may be used to change the angle of view. The orientation of the graph follows the position of the ball, and the user can move the track ball to any angular position in space. In this embodiment, the track ball is also used to change the viewpoint by clicking one of the track ball buttons, holding the clicked button, and rotating the ball. Other three dimensional input devices could also be used such as a motion sensitive input device that measures angular position in space and translation. In such an embodiment, the angular position in space controls the angular position of the graph, and the translation of the device linearly may control the viewpoint.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Machine data, such as vibration data flux data, and voltage data, is collected in a number of ways and analyzed to determine the operating characteristics and possible problems of machinery or other objects of interest. For example, periodic vibration data is often collected using a portable instrument, such as a CSI Model 2130 manufactured by Computational Systems, Inc. In such case, the vibration data is analyzed on the portable unit itself and the vibration data is also uploaded to a computer and further analysis is performed. Vibration data is also collected continuously by permanently installed vibration monitors such as the CSI Model 4500T also manufactured by Computational Systems, Inc. This continuous data is transmitted to a computer for analysis when some transient or other event of interest has occurred.

Often, the most effective way for an experienced vibration analyst to examine machine data is through interactive displays, such as the interactive display on a portable analyzer (e.g. CSI 2130) or the display of a computer, where cursors may be moved through the data sets to cause the display to report detailed information about selected points. When dealing with two-dimensional displays, simple cursors are readily visible as shown in FIG. 1 which displays a vibration spectrum for a piece of rotating equipment.

Figure 1:
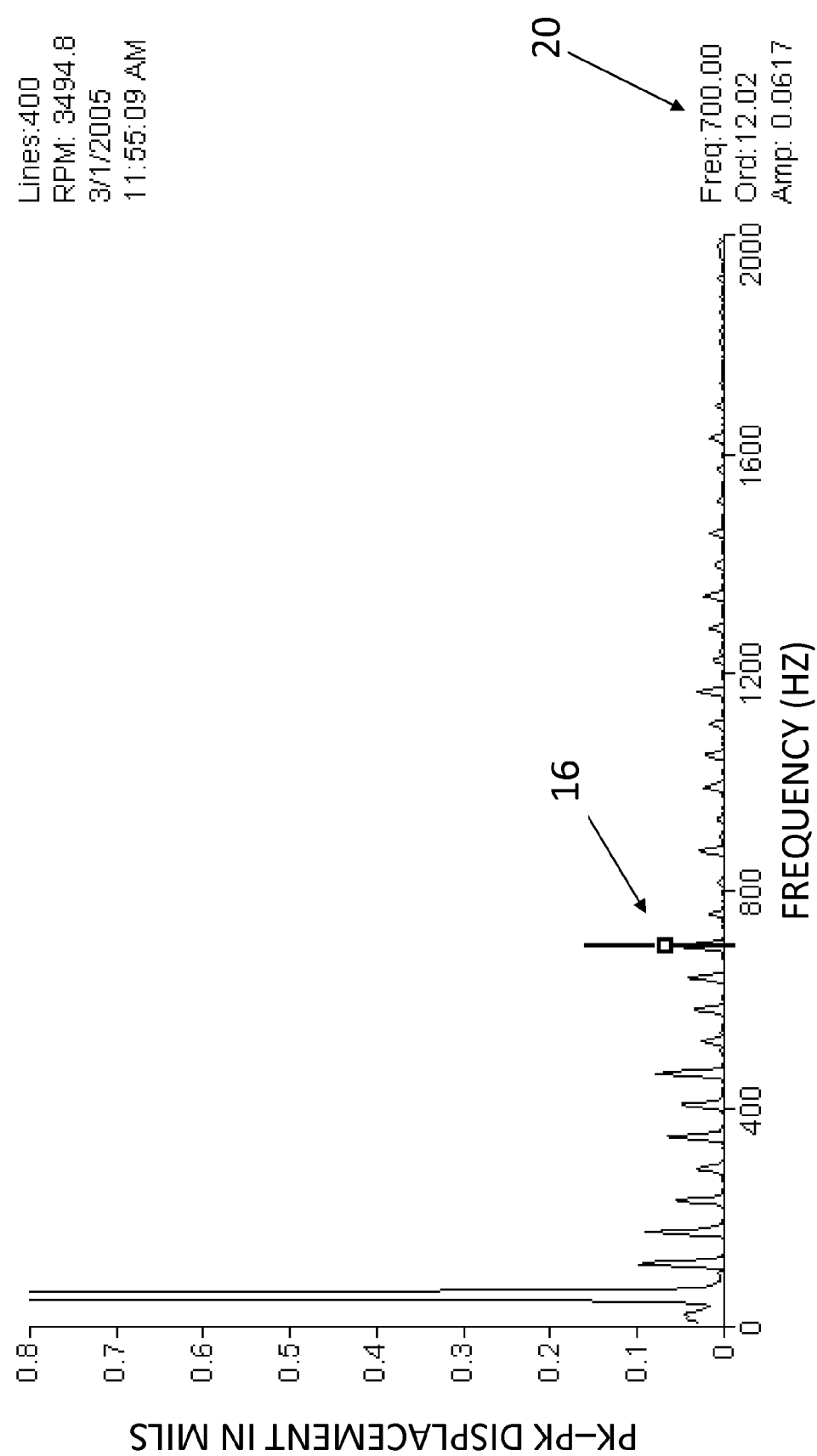
FIGS. 1-4 are two-dimensional displays of machine data found in the prior art.

Referring to FIG. 1, the analyst, using a mouse, a keyboard, or other input techniques, moves a cursor 16 over the data. In FIG. 1, the cursor is represented as a square marker drawn around the data point where the cursor is located. The square marker is used to indicate that this cursor is the "active" cursor. In this example, vertical lines are added above and below the marker to enhance the visibility of the cursor. As the cursor moves, the display is updated to show the data values at the position of the cursor. In the figure, the text 20 at the lower right indicates the frequency at which the cursor is positioned, both in orders and Hz and the amplitude of vibration at that frequency.

Figure 2:
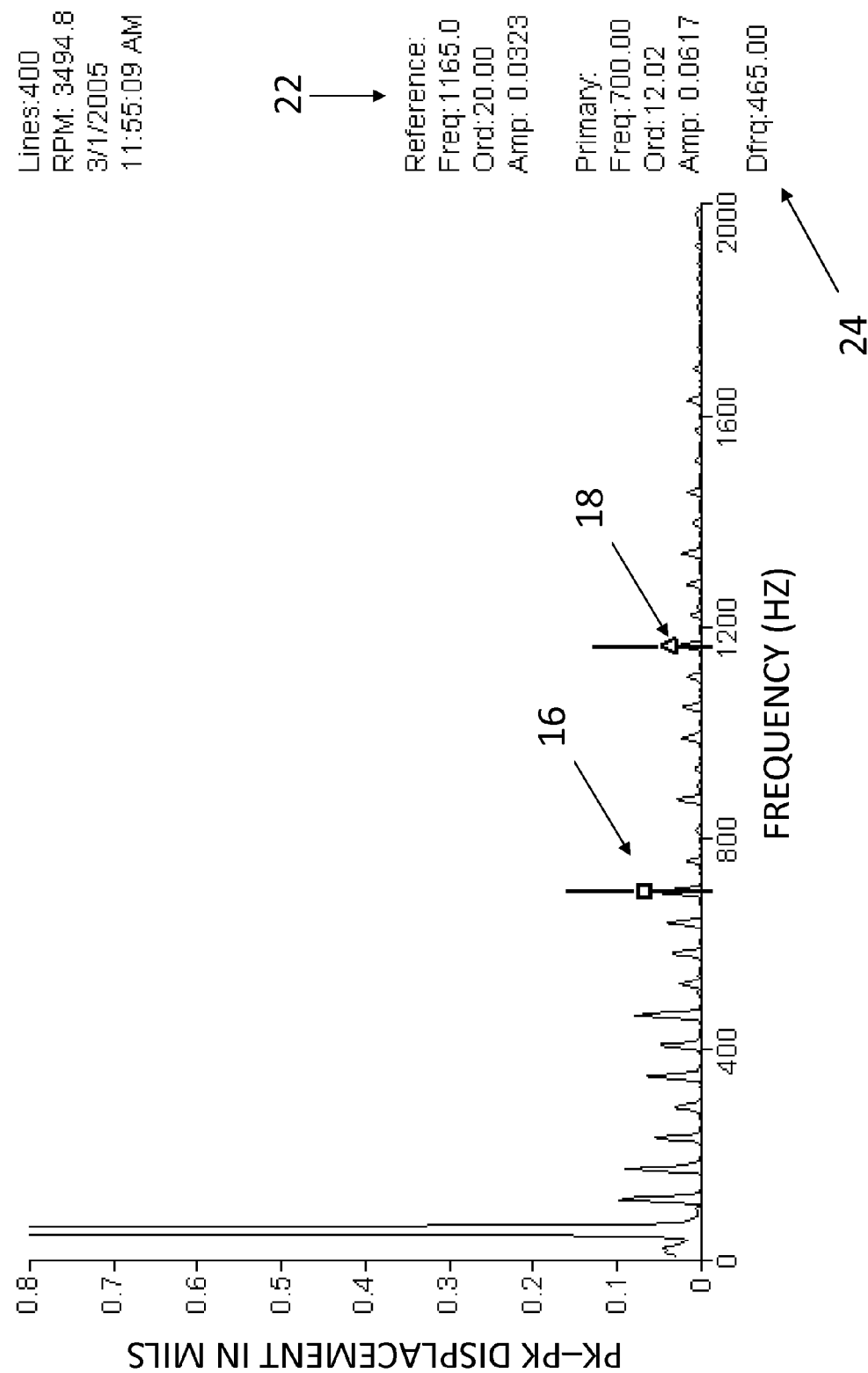

Often the analyst will use multiple cursors to permit differential measurements to be taken. FIG. 2 demonstrates the use of two cursors to determine the difference between two values. As in the previous example, the active cursor 16 is identified with a square marker. The reference cursor 18 has a triangular marker. Each cursor may be moved independently using a mouse, a keyboard, or other input techniques. As the cursors move, the readout 22 at the lower right now shows not only information about the data at each cursor, but also includes the frequency difference 24 between the cursors—a very important measurement for vibration and other types of machine analysis.

Figure 3:
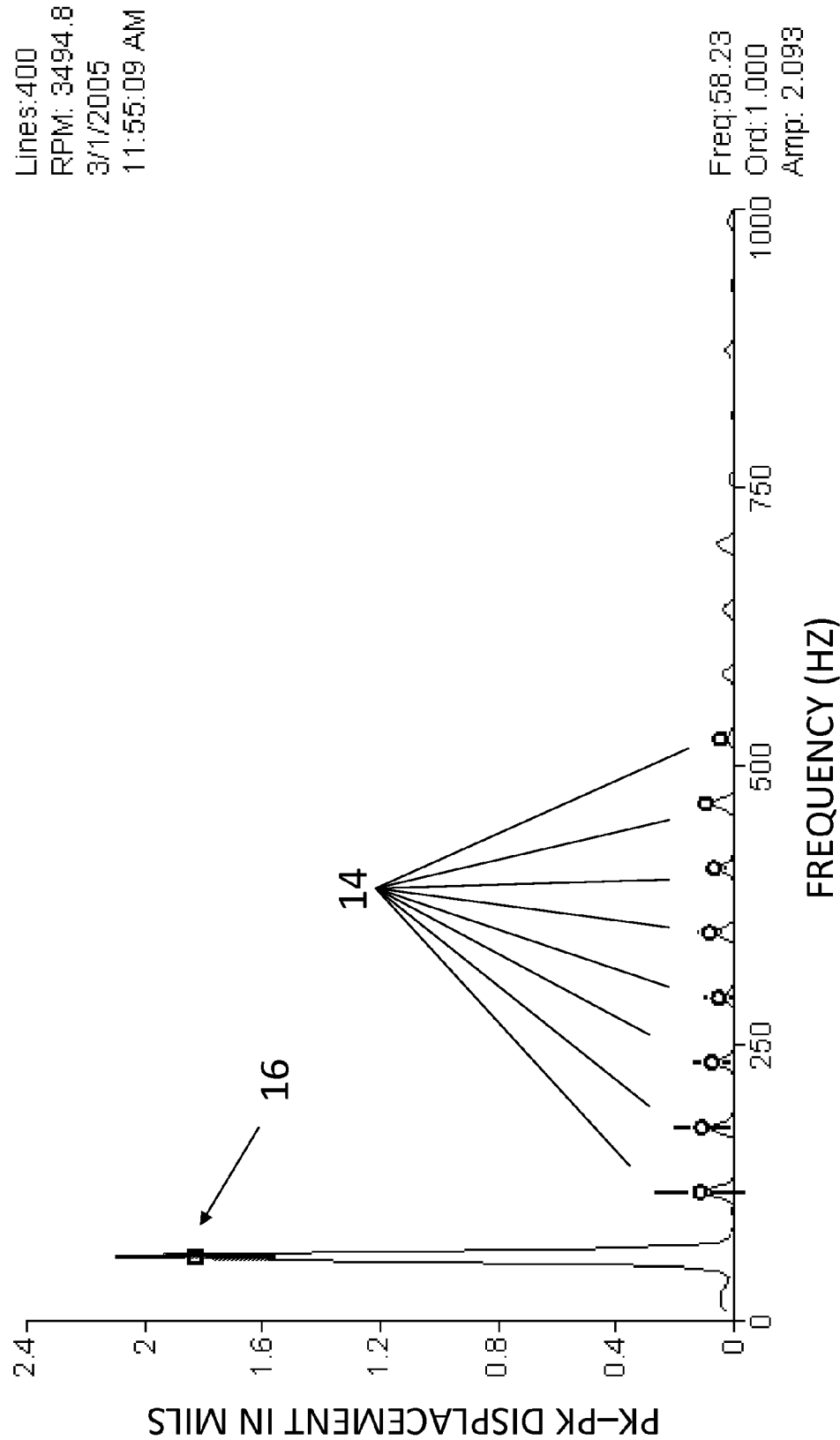

Due to the nature of vibration and other types of machine data, the existence of "families" of peaks with relationships between their frequencies are very significant. Specialized families of cursors can assist the analyst in the location of these features. FIG. 3 shows the use of harmonic cursors, a specialized cursor family which assists the analyst in identifying multiples of a frequency in spectral data. The active cursor 16 (indicated by the square marker) is positioned by the user at a specific frequency. The harmonic cursors 14 (with circular markers) are automatically positioned at integral multiples of the frequency of the active cursor. Note that the data represented in this figure shows numerous peaks that are harmonics of the rotation frequency (the largest peak—at the active cursor) of the monitored machine.

Figure 4:
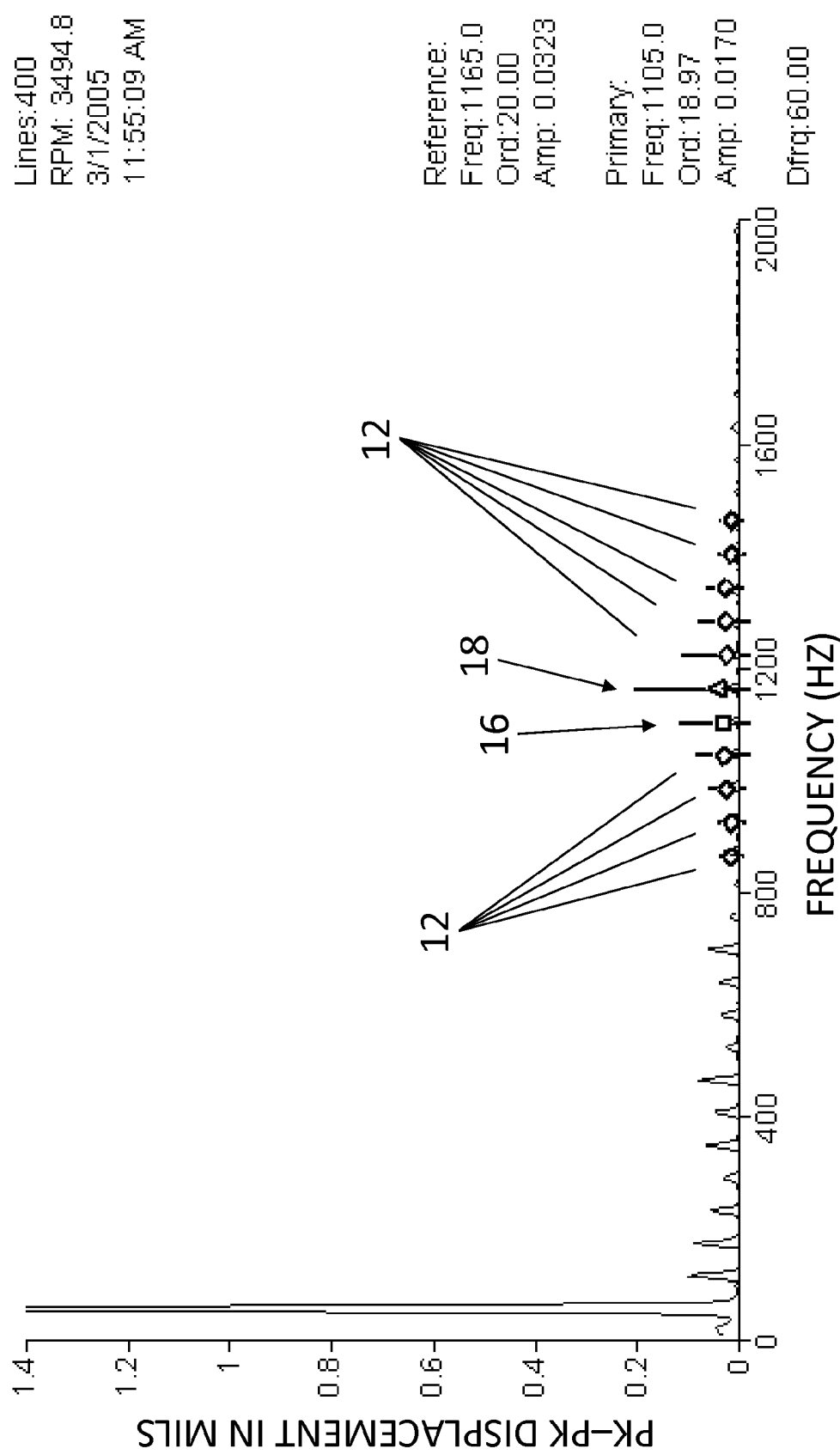

Another commonly used cursor family is shown in FIG. 4. These are sideband cursors which assist in identification of groups of peaks which are spaced at regular intervals about a given frequency. In this case, the reference cursor 18 (with the triangle marker) is placed by the user at a frequency of interest. Then the active cursor 16 (with the square marker) is positioned at a distance from the reference cursor. Sideband cursors 12 (with diamond shaped markers) are automatically drawn at multiples of the frequency difference about the reference cursor to help identify groups of sideband peaks.

Figure 5:
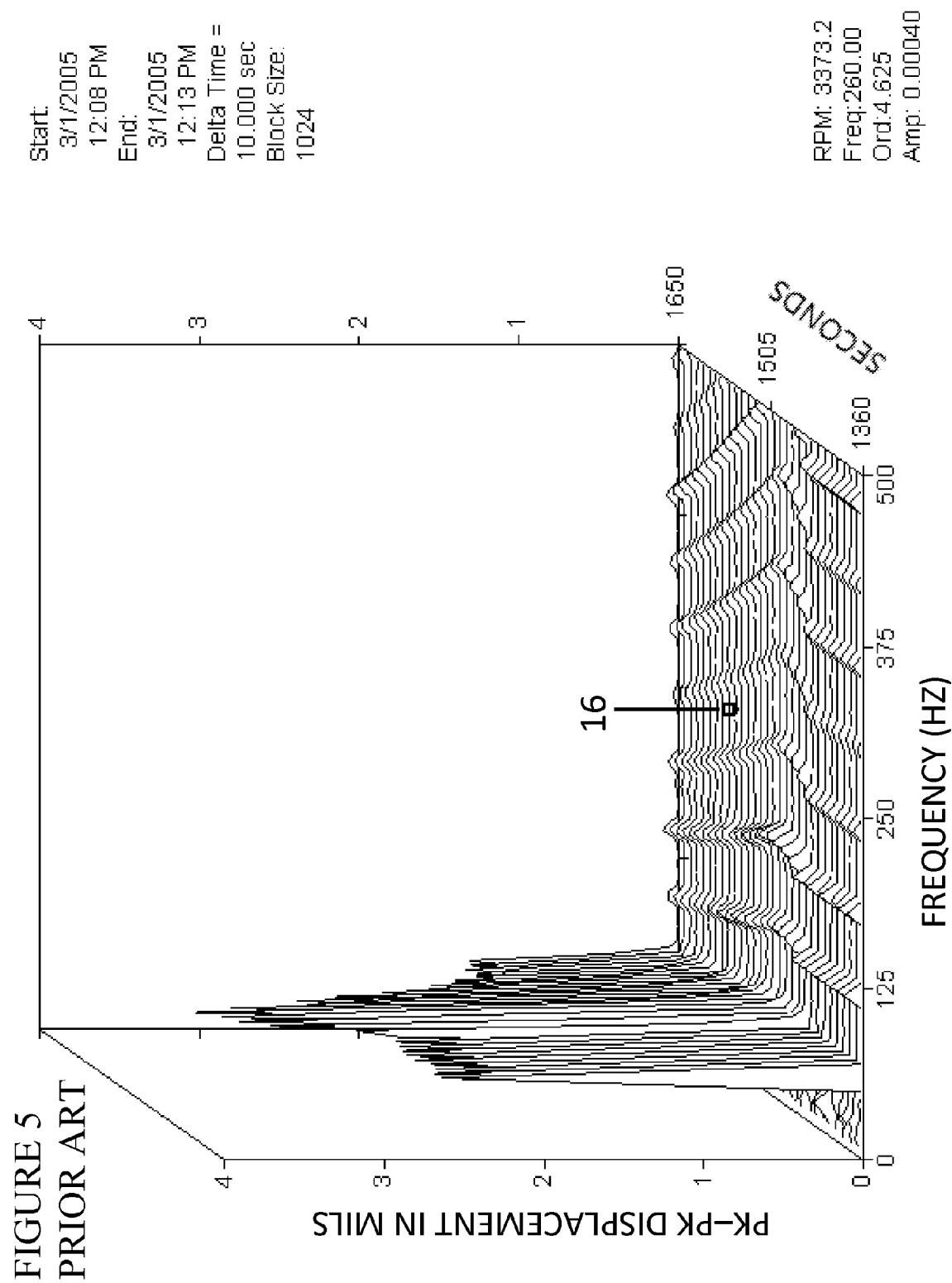
FIGS. 5-7 are three-dimensional displays of machine data attempting cursor manipulation using methods found in the prior art.

With recent improvements in machine data collection, storage and display, it has become possible to offer much more data to the analyst. An example of this is shown in FIG. 5. The data shown in the figure is a "cascade" of spectra taken periodically by a CSI Model 4500T system during the startup of a large steam turbine. Each of the data sets in the cascade is a spectrum similar to the data sets displayed by FIGS. 1 through 4. The cascade plots these spectra together to make changes in the vibration or other machine data characteristics of the machine more visible. Use of cursors in cascade plots or in other three-dimensional machine data displays is also desirable. FIG. 5 clearly shows that by their very nature, three-dimensional plots are visually very "busy". The techniques discussed above for representing cursors, as demonstrated by the active cursor 16 shown in the figure, are ineffective. Such cursor representations tend to "get lost" in the data.

Figure 6:
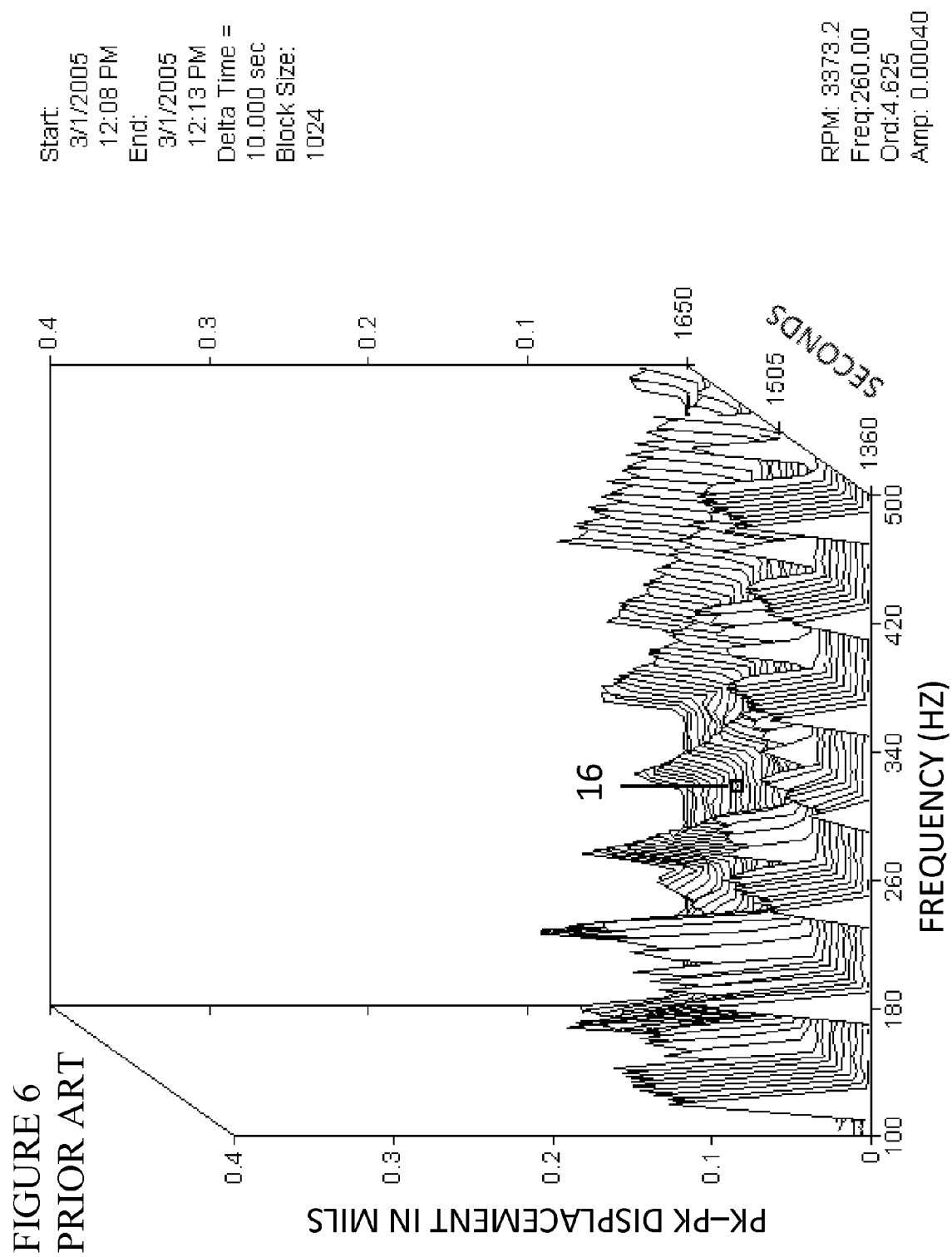

As shown FIG. 6, even when the display is "zoomed in" to the area of interest, the cursor 16 is quite difficult to locate visually. The cursor 16 in FIG. 6 was placed in a relatively "clear" spot so that it can be seen. However, as the analyst moves the cursor 16 near the peaks it can become very difficult to see. Furthermore, this type of cursor 16 can easily move behind data peaks and totally disappear from view.

Figure 7:
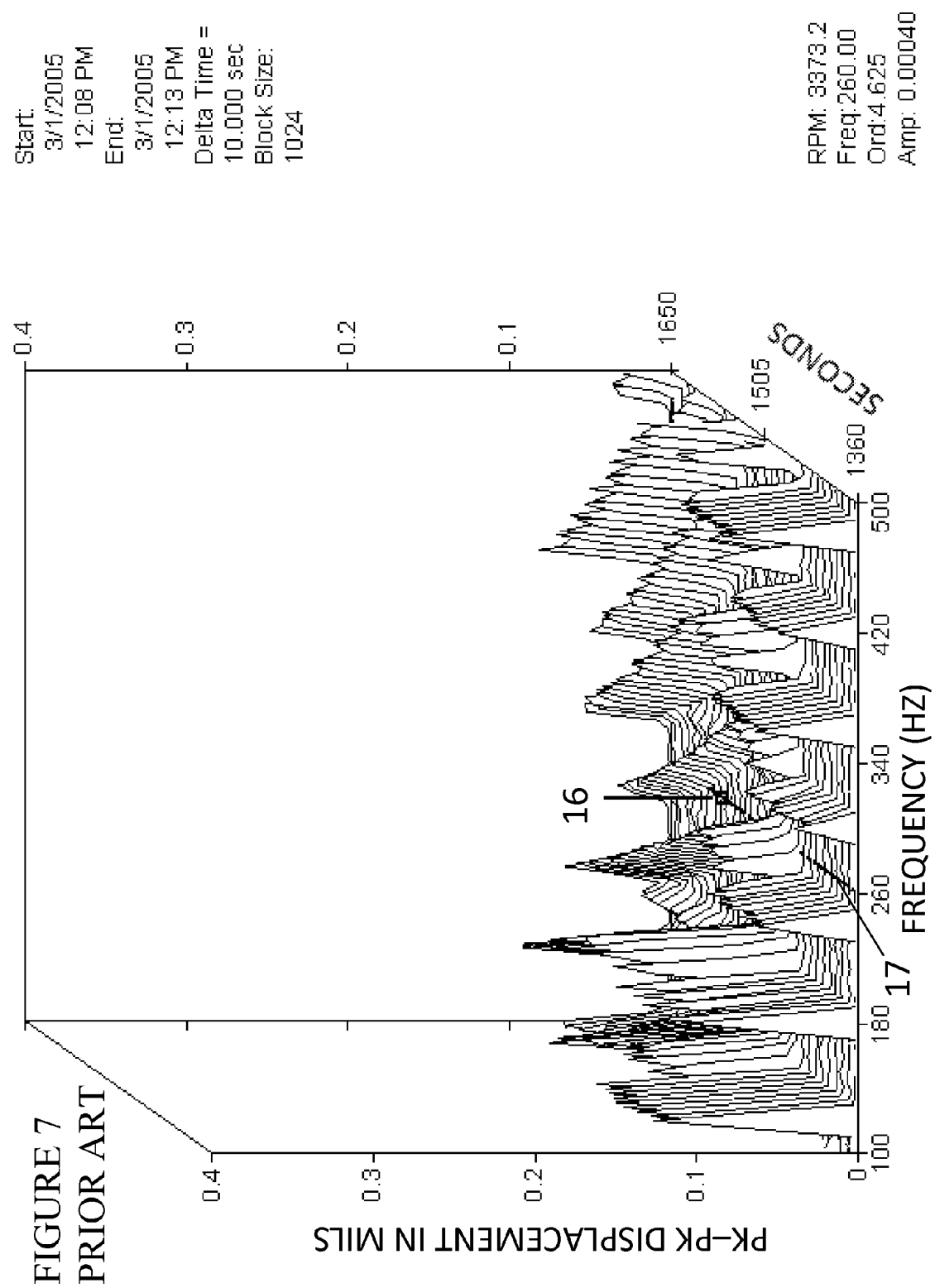

One approach used historically to assist in cascade type displays is the "floor" cursor 17 shown in FIG. 7. Note that placing the floor cursor 17 (the line along the floor of the plot) at the position of the cursor does help with visibility. However, the cursor can still easily "get lost" behind peaks in the data.

Figure 8:
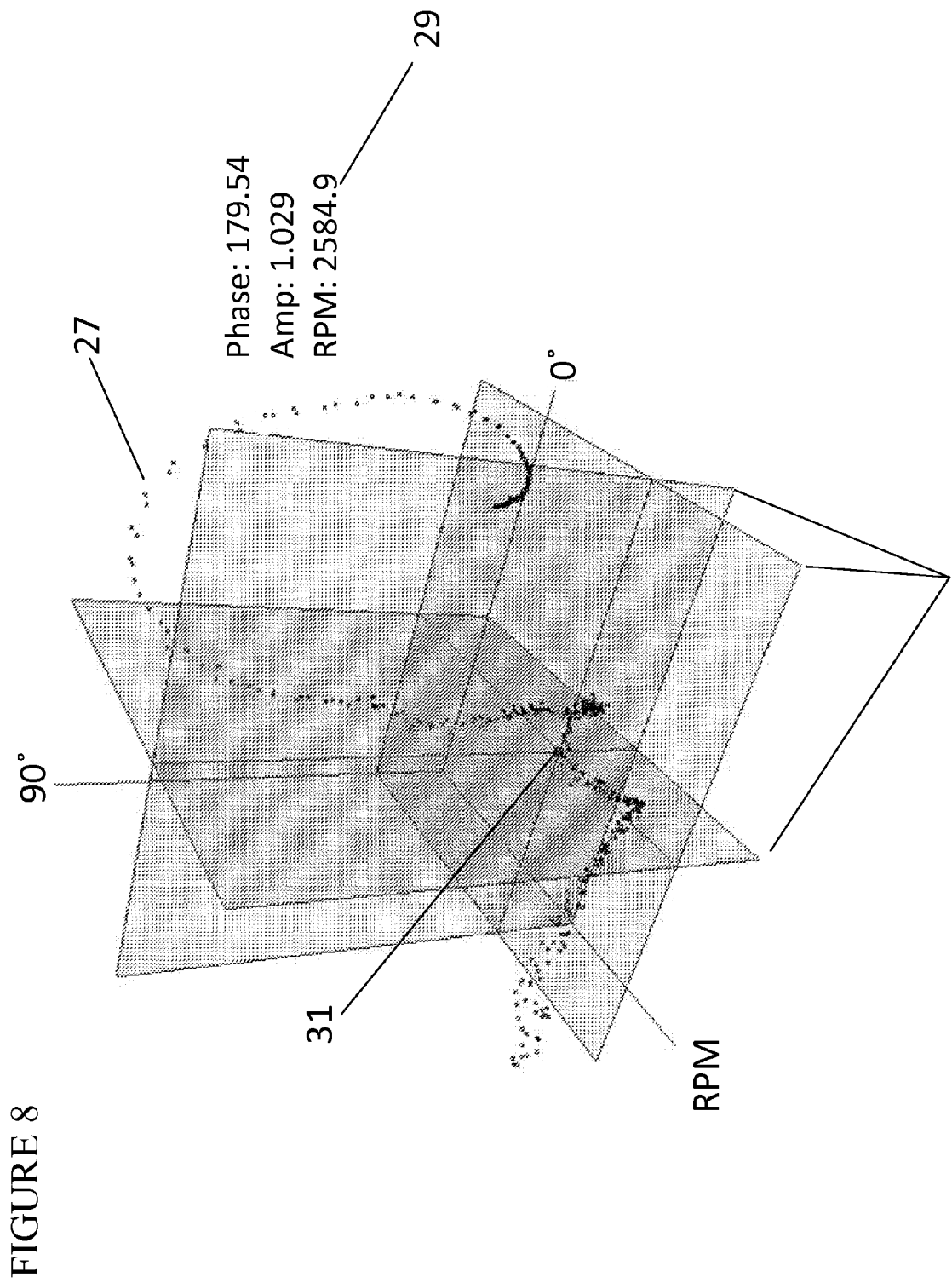
FIGS. 8-12 are three-dimensional displays of machine data illustrating semi-transparent planar cursors.

The use of semi-transparent plane cursors of the present invention solves these problems. One embodiment of this is shown in FIG. 8. That figure demonstrates the general case where semi-transparent plane cursors are applied to three-dimensional vibration data 27. In the figure, the data shown is peak-phase vibration measurements taken by a CSI Model 4500T system along a single plane of one of the turbine's bearings during startup. As the turbine's speed is increased, the peak vibration along the bearing's plane and the phase angle of that vibration was recorded. That data is plotted in FIG. 8 in three dimensions including peak, phase and RPM. Semi-transparent plane cursors 30 are used to identify a single point within the data. Each semi-transparent plane cursor 30 is rendered to appear much like smoked glass. That is, data (and other information) behind the plane is visible, but appears as though it were being viewed through smoked glass. Using a mouse, a keyboard, or other input techniques, the user may position each plane independently. As the planes move, the readout 29 at the right shows information about the data point 31 at the cursor—that is, at the point where the three planes intersect. As with the two-dimensional examples above, a square marker appears around the selected data point 31 to indicate that the active cursor is positioned there. In this embodiment, lines are also drawn along the intersections of the planes to further highlight the selected data point.

Figure 9:
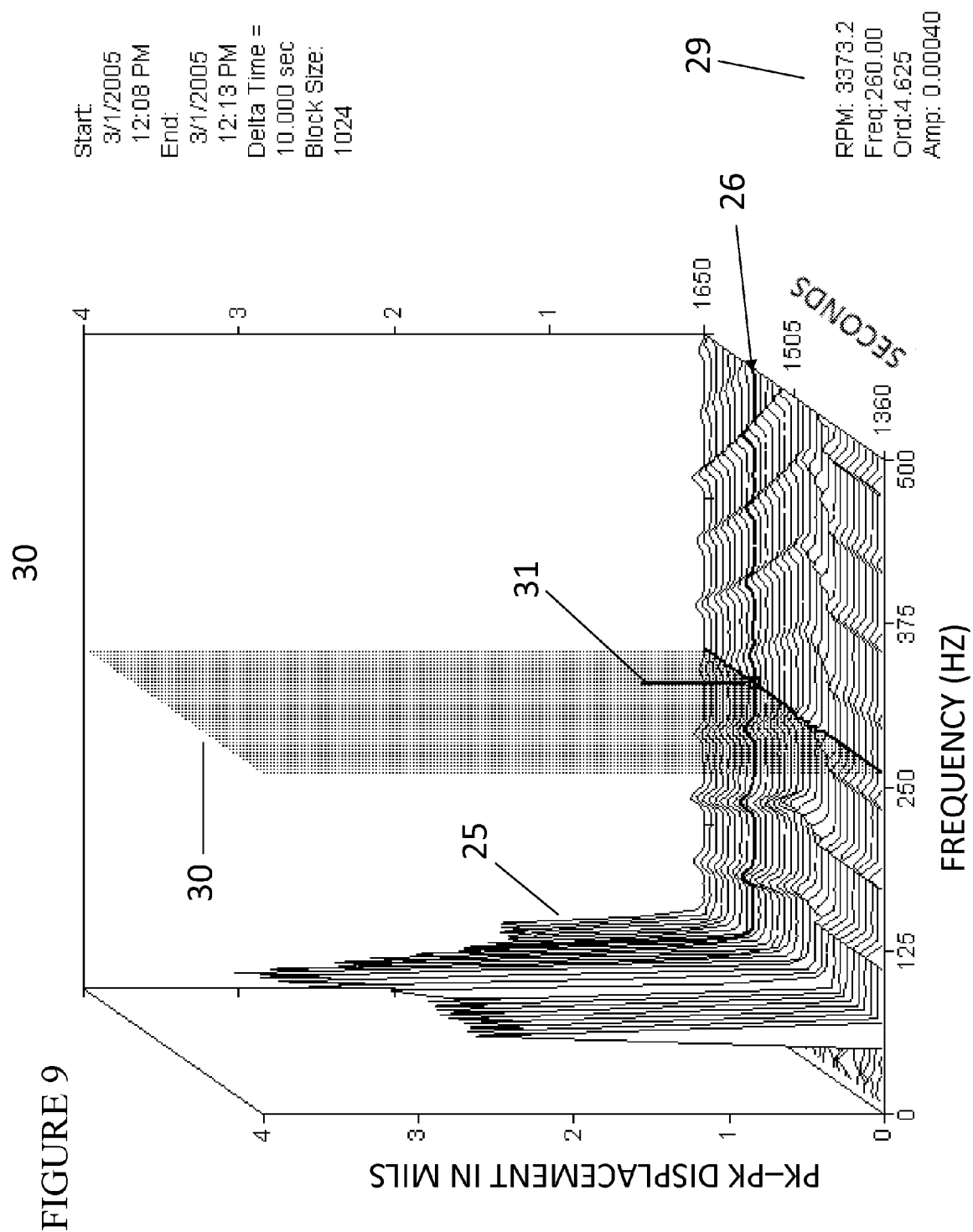
Figure 10:
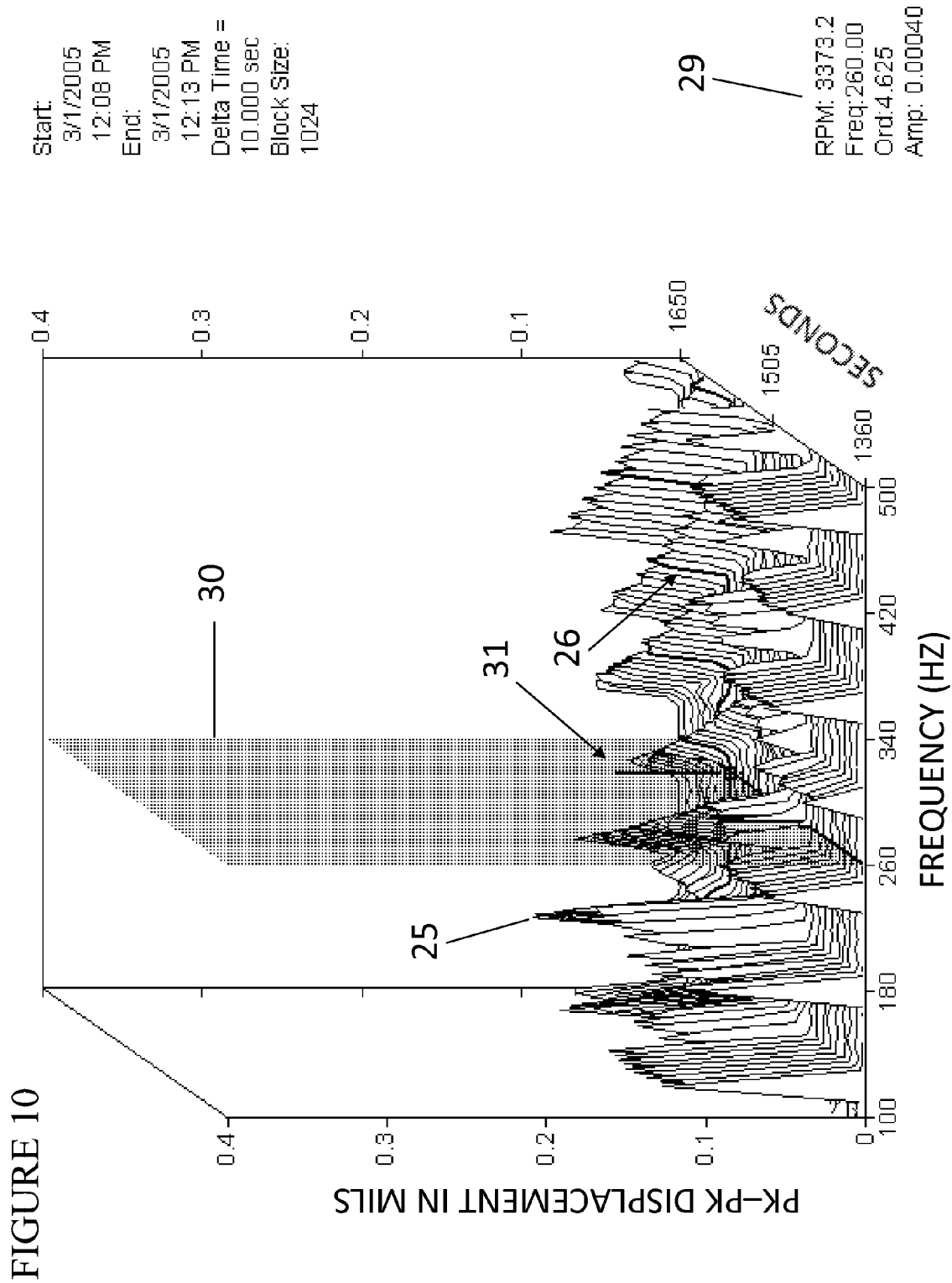
Figure 11:
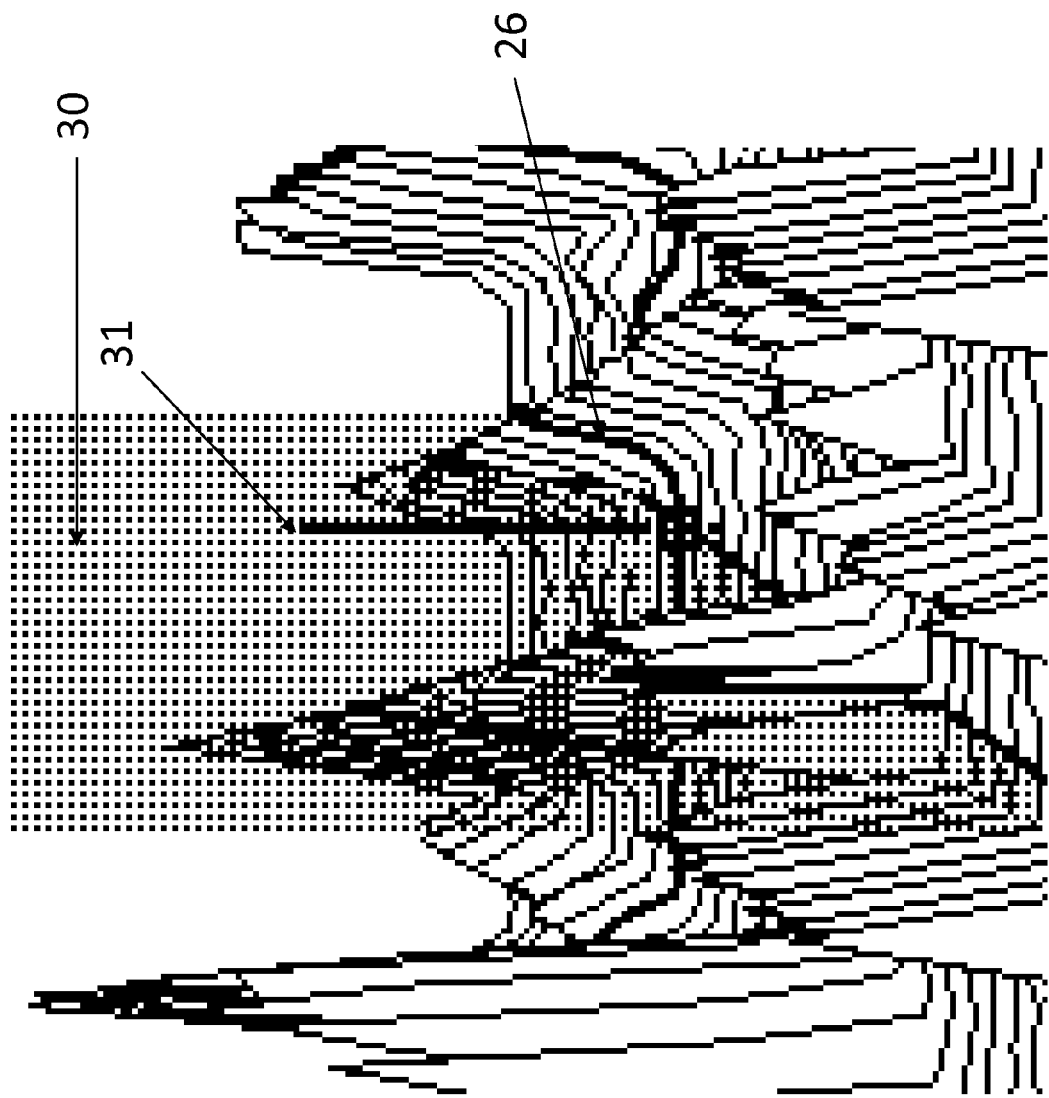

An alternate embodiment of the use of semi-transparent plane cursors with three-dimensional machine data is demonstrated by FIG. 9 and FIG. 10, in which vibration data 25 is plotted on a three-dimensional graph with displacement on a substantially vertical axis, frequency on a substantially horizontal axis, and time on an axis representing depth (the depth axis). In this cascade plot, each line of vibration data represents a spectrum calculated from vibration samples taken at different times during the startup of the turbine. While a cascade plot does represent three-dimensional data, the data is always rendered to appear like a surface. Because of this geometrical relationship, three semi-transparent planes are not required to uniquely identify a single data point 31. In this embodiment, a single plane cursor 30 is used to indicate the frequency. A second plane cursor could be used for identifying the data set (time) of interest. However, highlighting of the selected data set 26 can instead be used to identify the time of interest, without obscuring any other data sets. Since the cascade is a surface, the selected data point will be the point where the data surface, the data set indicator and the plane intersect. This representation makes it clear where the cursor is positioned at all times—even when the actual data point where the cursor is positioned is hidden from view. In this embodiment, the user may provide inputs through a mouse, keyboard or other input device to move the planar cursor 30 left or right along the horizontal axis. The user may also input commands to move the data set indicator 26 forward or backward along the depth axis. As in other embodiments, a square marker is drawn around the selected data point 31 to indicate that the active cursor is positioned there. As the plane and data set indicator are moved, information 29 regarding the vibration data at the selected data point is displayed. The close-up view shown in FIG. 11 demonstrates how the plane cursor 30 appears to cut through peaks providing clear indication of its location.

Figure 12:
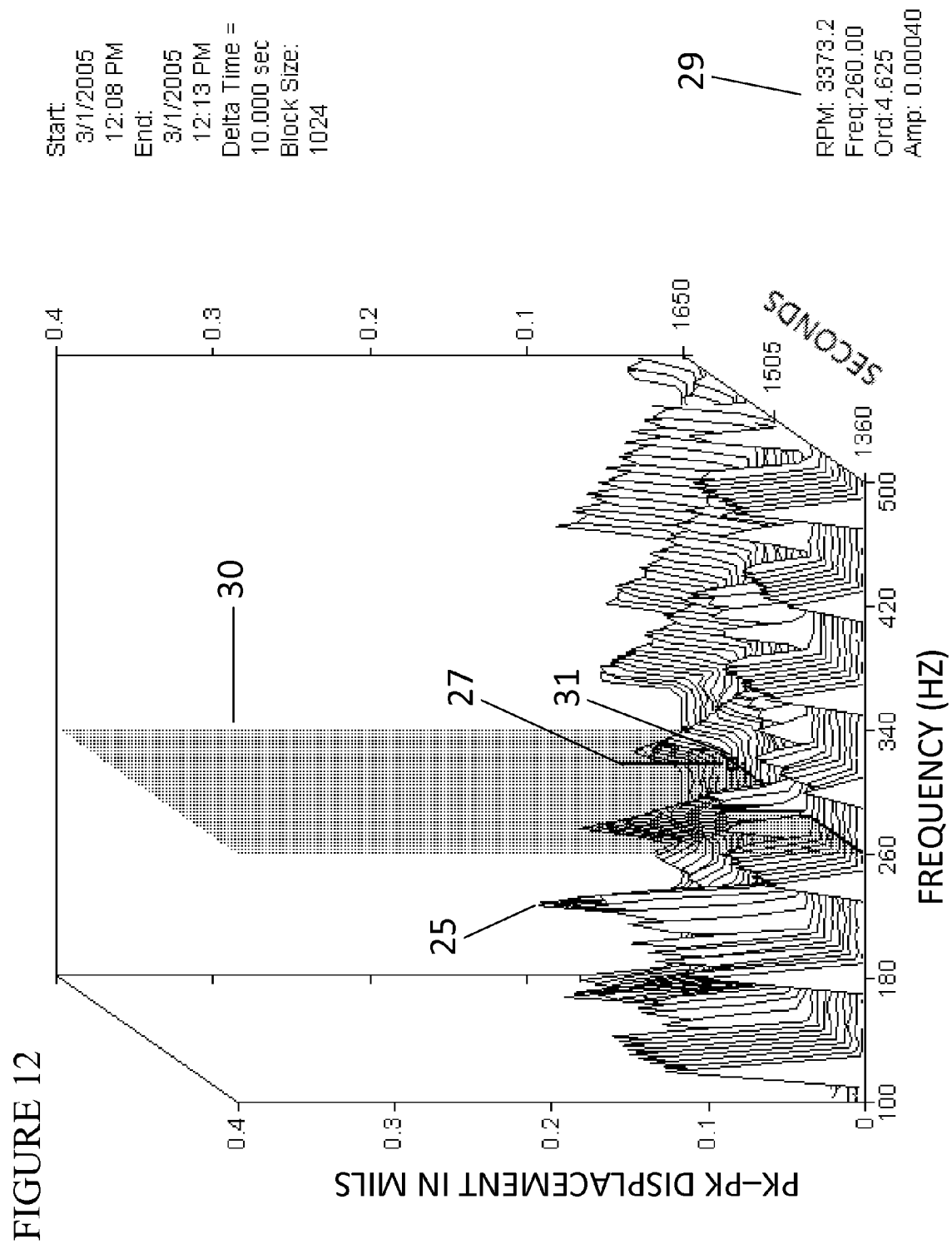

Using visual drop down menus on a display, for example, or other user input techniques known to those skilled in the art in various software suites, a user may select the type of indicator to be used for each data dimension. When dealing with a cascade plot, for example, the user might prefer to display a second semi-transparent plane cursor at the selected data set rather than highlighting the trace of the data set. If desired, a horizontal plane cursor could also be used to identify the displacement coordinate of the selected data point. Alternately, as shown in FIG. 12, the user might prefer to use the plane to indicate frequency and a line 27 above the marker to identify the selected data point 31.

Figure 13:
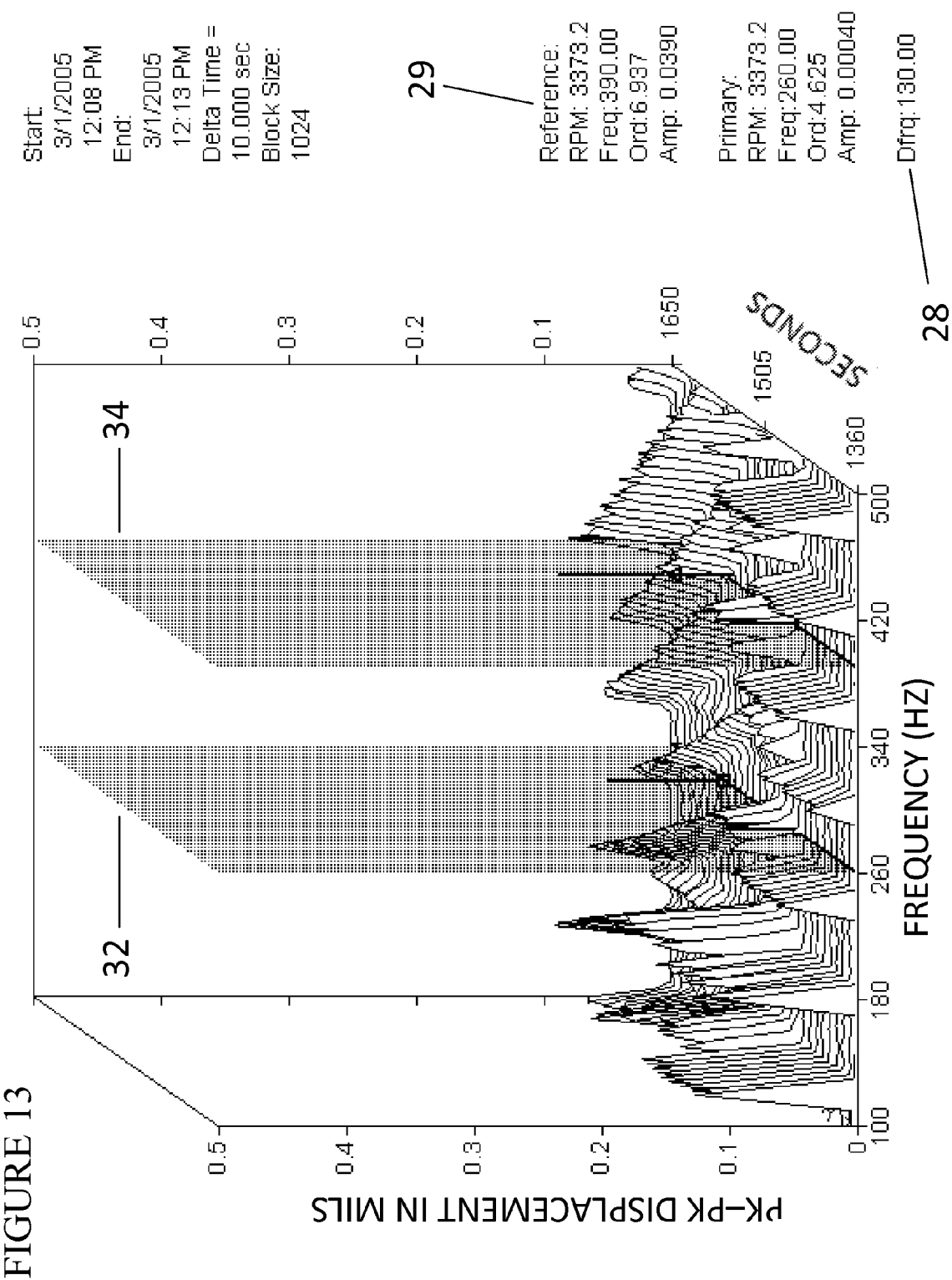
FIGS. 13-17 are three-dimensional displays of machine data illustrating a number of applications of semi-transparent planar cursors.
Figure 14:
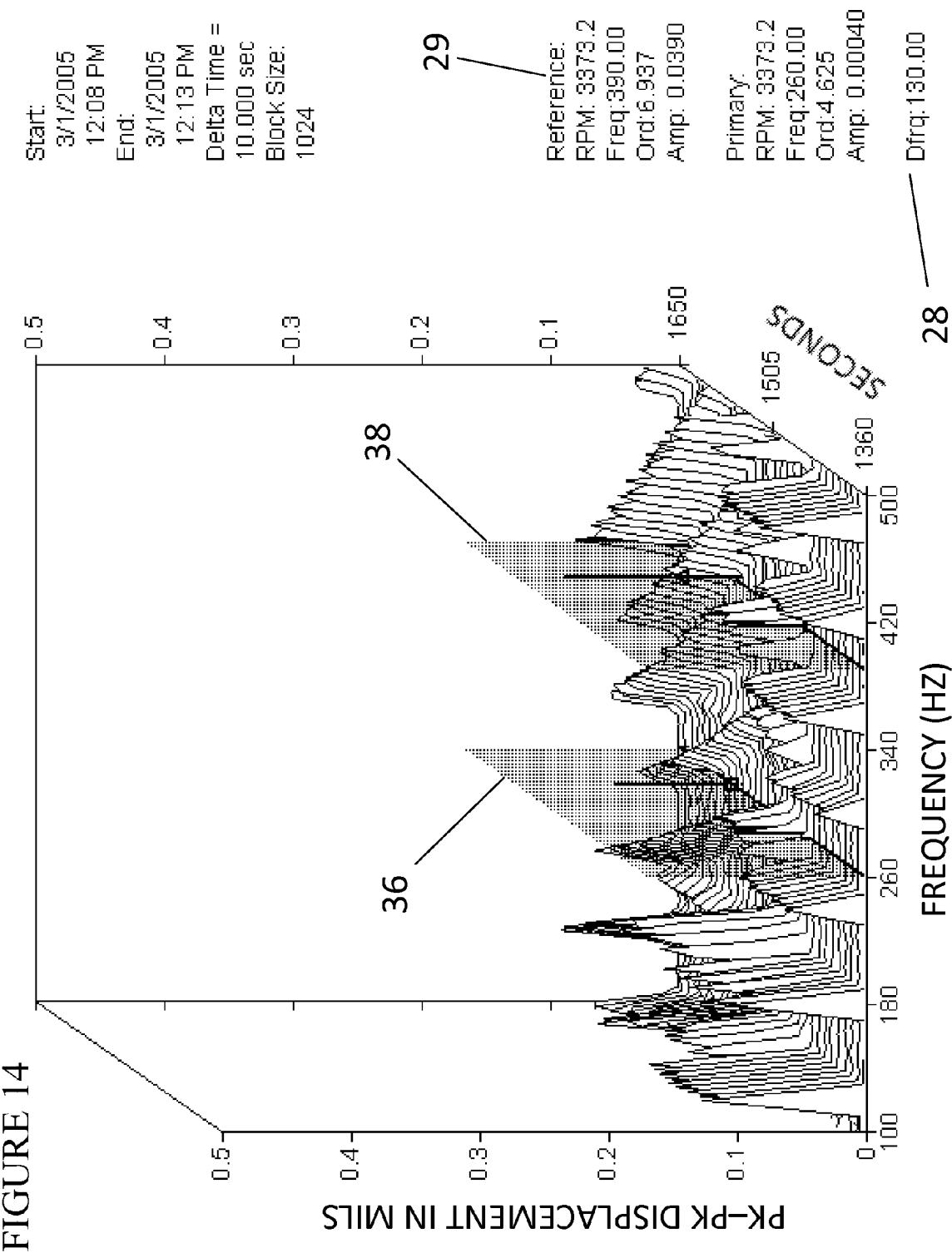

Any number of planar cursors may be placed on the display at the same time. The plane cursors 30 may be drawn in any color at any desired height, and FIGS. 13 and 14 illustrate different height cursors. Again, the user controls the height of the cursors 32 and 34 by providing user commands. The cursors 32 and 34 on FIG. 13 are taller than cursors 36 and 38 shown in FIG. 14, but both cursor sets are positioned identically relative to the data. In some applications the ability to vary cursor height will enhance the clarity of the information shown and in some cases a shorter cursor will appear less busy and allow for more data to be shown on the same display. The information 29 displayed adjacent the machine data provides detailed information as to the machine data at the positions of the two planar cursors 32 and 34. In addition, the difference frequency 28 is displayed representing the frequency difference between the positions of the two planar cursors 32 and 34 (or 36 and 38).

When this embodiment is implemented on a personal computer, one way to move the various cursors is to use a mouse to drag the cursors 32, 34 (or 36, 38) and data set selectors to desired positions. Also, after a cursor is selected it may be bumped in fine increments using, for example, the arrow keys on the keyboard of the personal computer. Alternately, different keystrokes permit the user to step the cursor through points of a data set or between data sets as desired. For complete control, a dialog box can be opened which permits the user to specify exactly the coordinates for cursor positioning.

Figure 15:
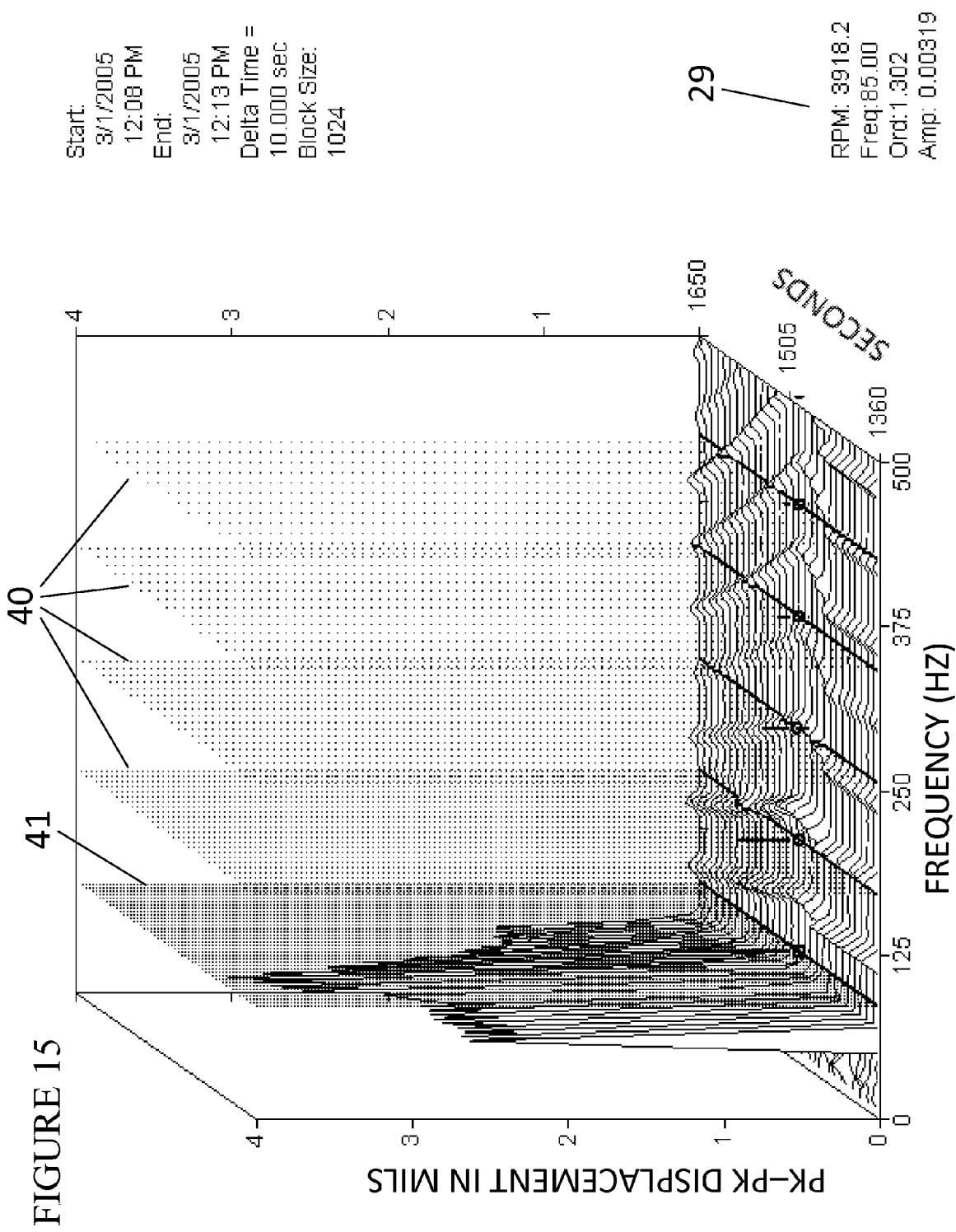
Figure 16:
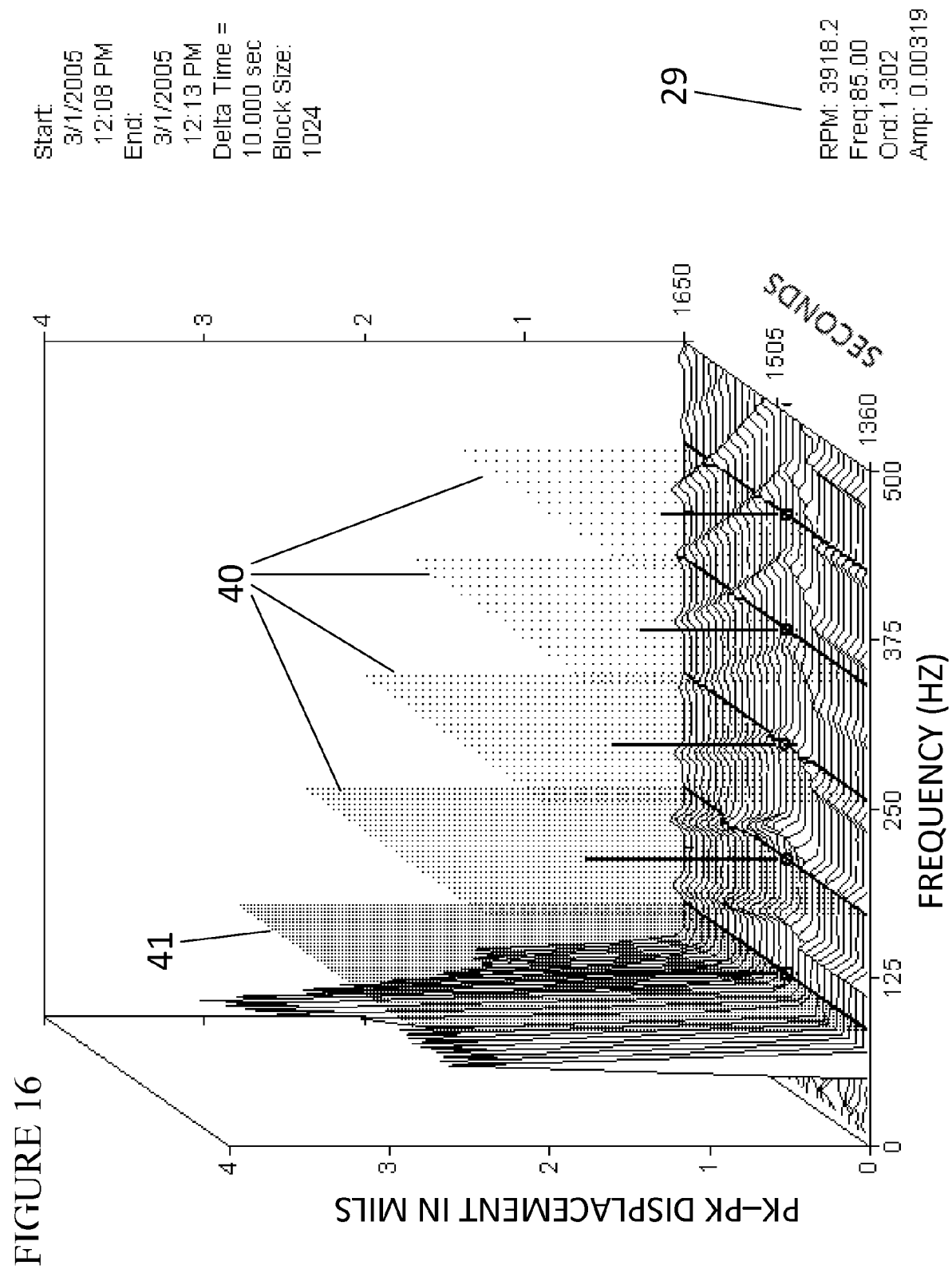
Figure 17:
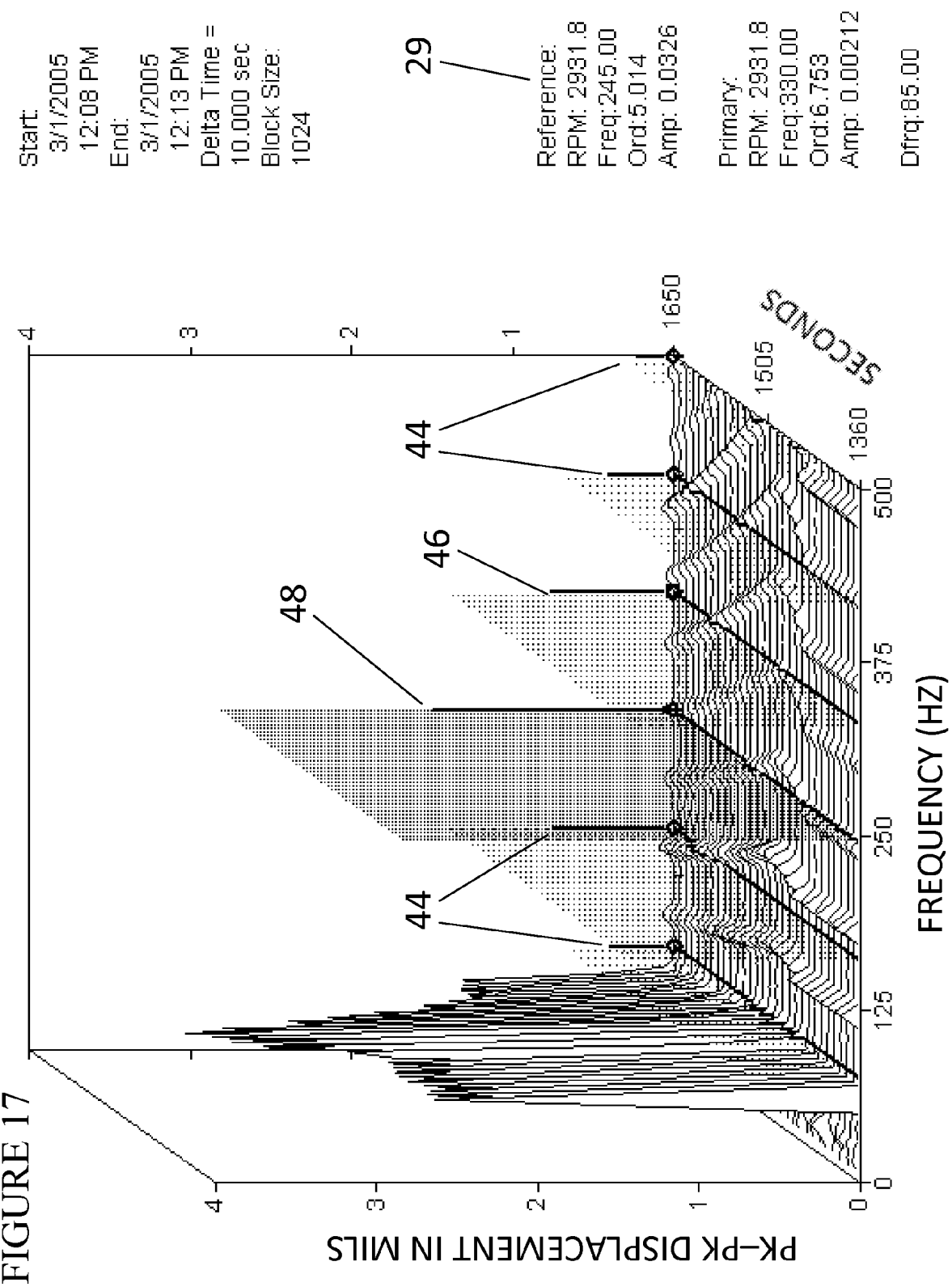

Additionally, as shown in FIGS. 15-17, the density (opacity) of the plane cursors can also be adjusted as needed. As FIGS. 15-17 demonstrate, harmonic and sideband cursors can be represented quite effectively using semi-transparent plane cursors. FIGS. 15 and 16 show two examples of harmonic cursors 40. As in the two-dimensional case, the active cursor 41 (indicated by the square marker) is positioned by the user at a specific frequency. The harmonic cursors 40 (with circular markers) are automatically positioned at integral multiples of the frequency of the active cursor. Harmonic cursor mode may be enabled/disabled using a drop down menu or other techniques. The number of harmonic cursors displayed, their color, their density fade and/or height decay parameters are all selectable using drop down or pop up menus or some other techniques.

An example of possible display of sideband cursors 44 on a cascade plot is shown in FIG. 17. As in the two-dimensional case, the reference cursor 48 (with the triangle marker) is placed by the user at a frequency of interest. Then the active cursor 46 (with the square marker) is positioned at a distance from the reference cursor. Sideband cursors 44 (with diamond shaped markers) are automatically drawn at multiples of the frequency difference about the reference cursor to help identify groups of sideband peaks. In this embodiment, the planar sideband cursors 44 are chosen with different heights with the cursor height becoming smaller as the cursor is positioned further from the reference frequency. In other words the higher order side bands are designated with shorter planar cursors. In this embodiment, it is shown how each cursor 44 is still visible even when it is behind another cursor 44.

The planar cursors described above are particularly well suited for use with a three-dimensional graph having a movable viewpoint, such as a graph in which the data may be viewed from any direction and from any position in virtual three-dimensional space. In other words a user may change the position of a user's virtual viewpoint so as to enable a user to analyze the graph from within the virtual three-dimensional space where the data is displayed.

One of the strengths of modern machine monitoring systems (specifically the CSI 4500T) is their ability to simultaneously acquire continuous, unbroken waveform data from multiple signal channels, each having extremely accurate corresponding tachometer pulses. From data of this type, numerous multi-dimensional data sets can be generated and displayed which can prove extremely valuable in analysis of vibration and other parameters during transient operation of various types of rotating equipment or other mechanical devices.

One example of such a complex data set is peak-phase information. From a single waveform channel and its corresponding tachometer signal, peak-phase data can be produced. Peak-phase data identifies the largest vibration and the effective phase angle at which it took place during short intervals (of either time or rotations). The conventional method for display of peak-phase information is with Bode and Nyquist plots, examples of which are shown in FIG. 18 for data from a five-minute period during the startup of a large turbine.

Figure 18:
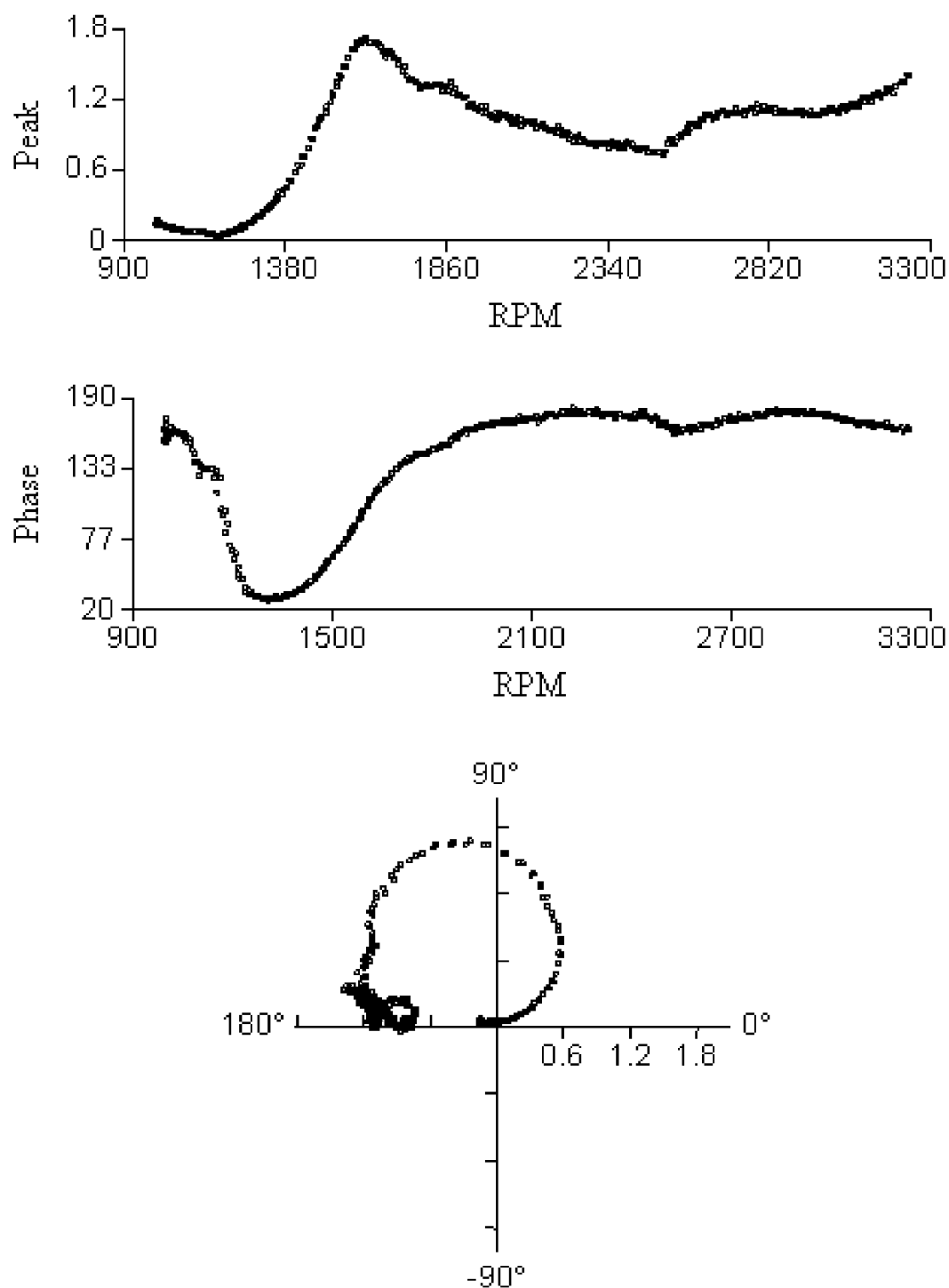
FIG. 18 is a Bode—Nyquist plot of peak-phase information from vibration of a large turbine during start-up.
Figure 19:
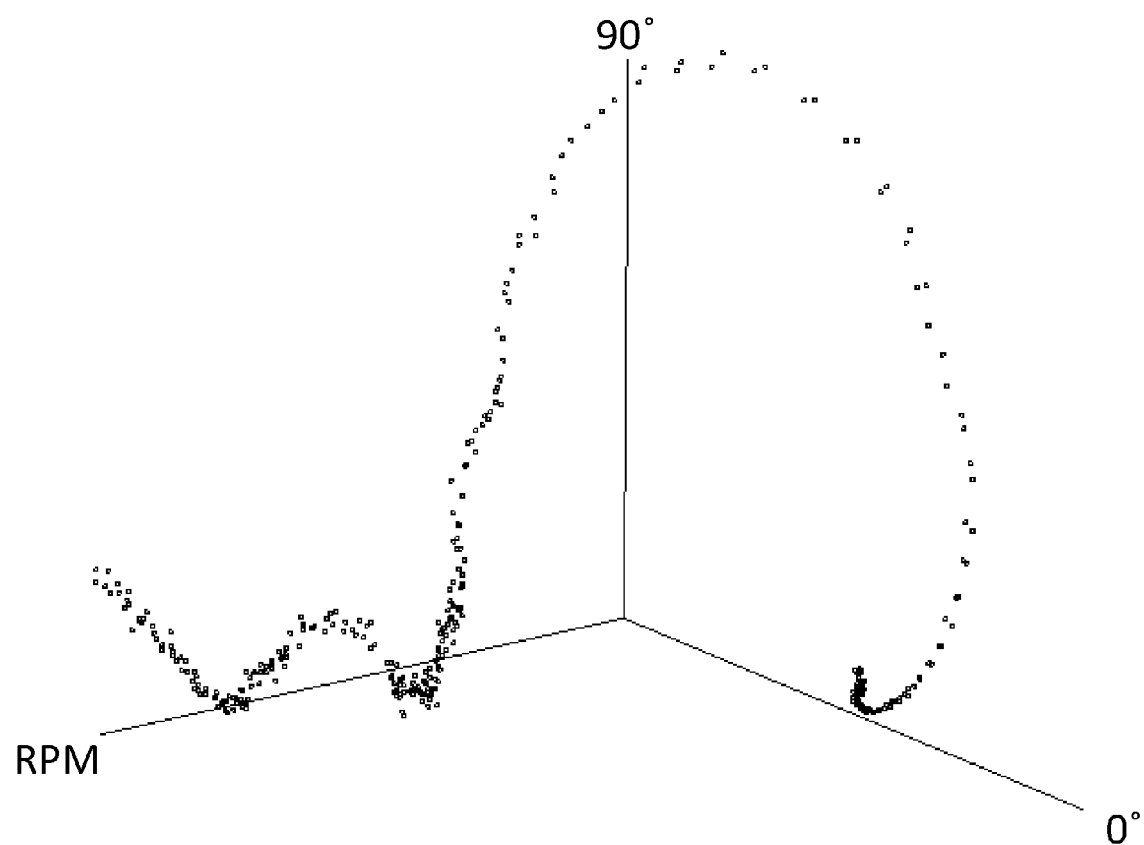
FIG. 19 is a three-dimensional graph of the peak-phase information from vibration of a large turbine during start-up.

The two Cartesian plots at the top of the FIG. 18 are Bode plots which display peak amplitude vs. RPM and phase angle vs. RPM respectively. The polar Nyquist plot, at the bottom of FIG. 18 displays peak amplitude vs. phase angle. These plots are actually two-dimensional projections of a more general three-dimensional set of data. This data may be more easily understood by using the display method discussed below. In one embodiment the information is dynamically displayed in a three-dimensional peak-phase information plot. An example of this is shown in FIG. 19.

Figure 20:
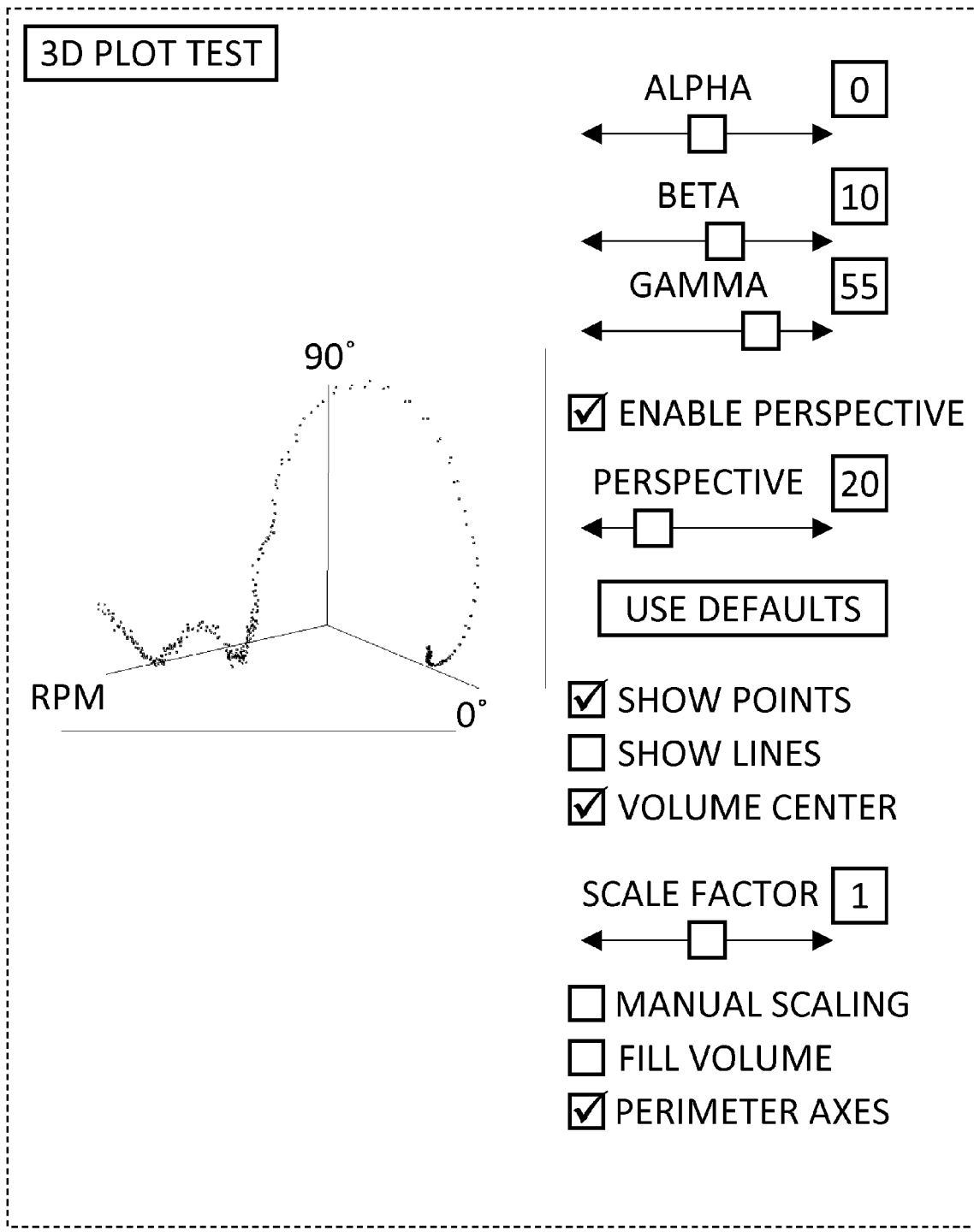
FIG. 20 is a screen shot of an exemplary interface for a computer allowing a user to rotate data about three independent axes and vary the perspective and viewpoint of the three-dimensional view.

The three-dimensional display makes trends in the data set very clear. Furthermore, allowing a user to rotate the display in virtual space provides an even better technique to evaluate and understand the data. FIG. 20 shows an exemplary interface allowing the user to rotate the data set about three independent axes.

Figure 21:
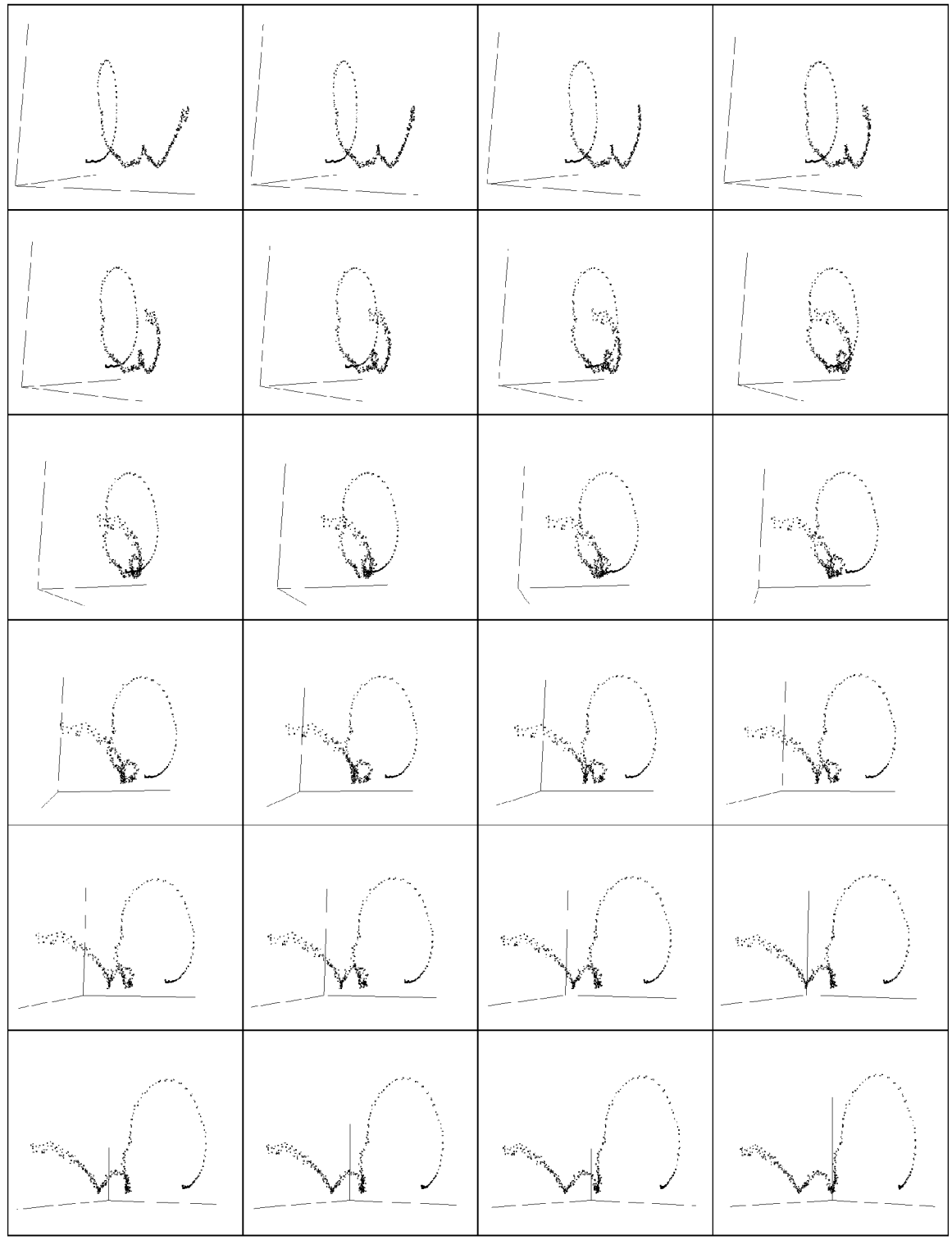
FIG. 21 is a three-dimensional graph of the peak-phase information in which each pane of the figure shows the graph rotated five degrees about a vertical axis.
Figure 22:
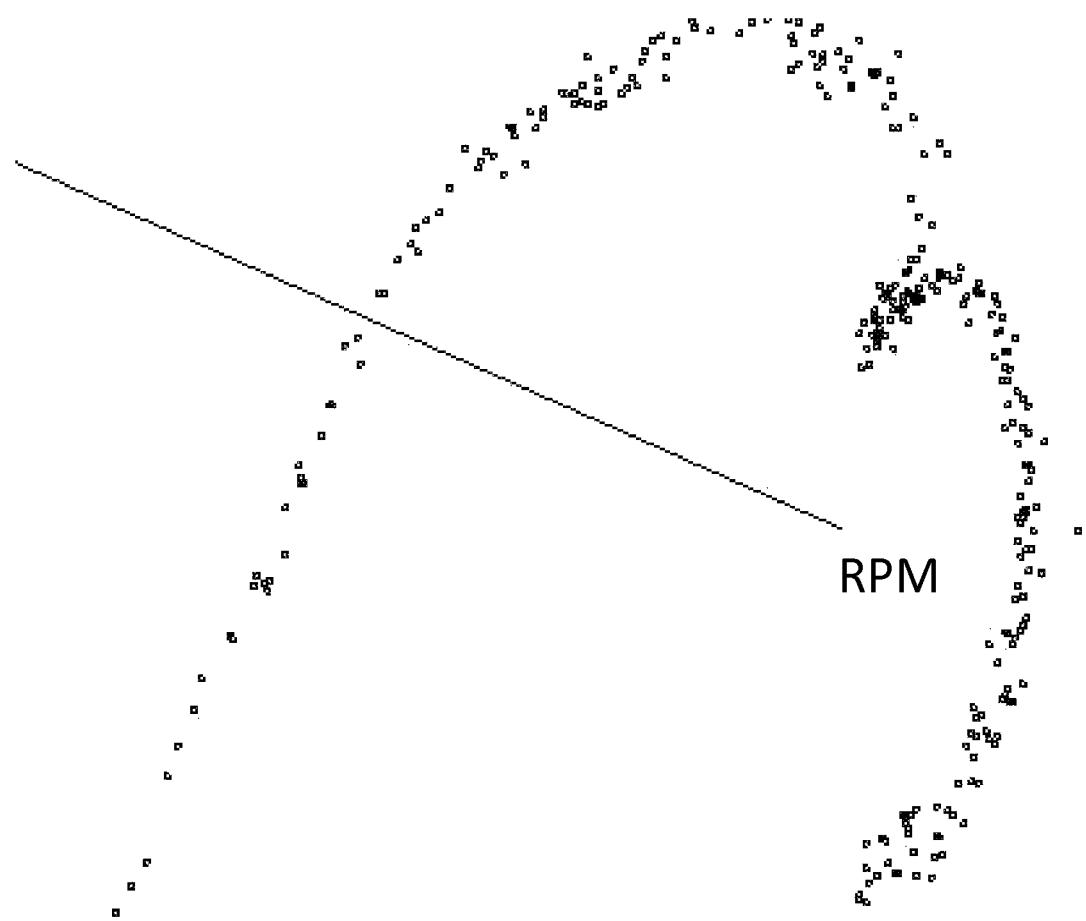
FIG. 22 is a three-dimensional graph of the peak-phase information with the viewpoint moved to a point inside the dimensions of the graph so the viewpoint is inside the graph and the viewer sees the information from the inside out.

By manipulating the top three slider controls, the graph is rotated in three dimensions and spatial relationships among the data points become much more obvious. Although it is difficult to portray such three-dimensional manipulation in a printed document, FIGS. 21 and 22 are an attempt to do so by demonstrating an embodiment of such a display. In each pane of FIG. 21 the "Gamma" angle has being increased 5 degrees, thereby rotating the graph around a vertical axis. FIG. 21 is the same type of graph as shown in FIG. 8, and the planar cursors shown in FIG. 8 may be used in the graphs shown in FIG. 21. In such case the cursors rotate with the graph and help provide a visual indication of the three-dimensional rotation that is occurring. In FIG. 21 the cursors are omitted, but the visual benefit of rotation of the data is readily apparent.

FIG. 21 only hints at how powerful manipulation of a three-dimensional plot can be. Clearly, without such manipulation, it would be nearly impossible for an analyst to recognize the "pigtail" nature of the example data set. A user can move the graph in all three dimensions and see the graph move. The actual movement greatly increases the ease with which a user can view the flat screen and see the three dimensions that are being portrayed. Unfortunately, actual movement cannot be portrayed in the Figures.

In addition to allowing a user to twist and turn the data, the three-dimensional representation also allows the data set to be viewed "from the inside" as shown in the FIG. 22 in which the apparent user viewpoint has been adjusted so that the graph is viewed from inside the physical dimensions of the three-dimensional graph.

Some additional enhancements of viewing of machine data using this technique are:
A. Use of color can greatly enhance three-dimensional displays of machine data. For example, showing intervals of increasing RPM as green and periods of decreasing RPM as red further enhances the display and aids the analyst in their visualization.
B. Interactively moving cursors throughout data sets would provide for direct measurement of features. This feature is especially advantageous when using planar cursors as described above in this interactive three-dimensional display. The planar cursors rotate with the graph and further provide movement feedback to enhance a user's ability to visualize the three-dimensional nature of the graph.
C. The three-dimensional displays may be updated dynamically to highlight the "current" state of the machine relative to its history (or, for replay, its future) by using an application capable of collecting live (or replayed) transient data such as, for example, Machinery Health Manager available from Computational Systems, Inc. Automatically placing a cursor on the active point, or causing it to blink or change color or size, would make it clearly visible. It should be noted that, in addition to acting as a tool for machine analysts, replay of interesting behaviors in this fashion is likely to be quite effective for training new analysts.
D. Using a track ball or other three-dimensional input device to directly control the three-dimensional orientation selection of a graph of data would improve and facilitate a user's control of the displays.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of displaying machine vibration data indicative of vibration produced during transient operation of rotating equipment, the method comprising the steps of:
   a. receiving the machine vibration data at an electronic device having a display, the machine vibration data expressed as vibration peak amplitude versus vibration phase angle versus RPM;
   b. displaying an image corresponding to the machine vibration data on the display in a three-dimensional graph in which the vibration peak amplitude and vibration phase angle are depicted in a polar plot as a function of RPM of the rotating equipment during the transient operation, the three-dimensional graph including an RPM axis that is perpendicular to the polar plot; and
   c. rotating the three-dimensional graph about an axis of rotation in response to input to the electronic device.

2. The method of claim 1 further comprising the step of displaying a primary cursor image representing a substantially planar cursor on the display, wherein the substantially planar cursor is disposed parallel to the polar plot or to the RPM axis.

3. The method of claim 2, further comprising the step of moving the primary planar cursor image on the display in response to user inputs to intersect the machine vibration data at one or more desired locations along the displayed data.

4. The method of claim 2, further comprising the step of outputting information corresponding to the machine vibration data at the intersection of the primary planar cursor image and the machine data.

5. The method of claim 2 wherein the step of displaying a primary cursor image comprises displaying a primary semi-transparent cursor image whereby the data behind the primary semi-transparent cursor image in the three dimensional graph is partially obscured and partially visible.

6. The method of claim 2 further comprising the step of displaying one or more secondary cursor images representing one or more substantially planar cursors on the display, wherein the one or more secondary cursor images are spaced apart from the primary cursor image in a pattern corresponding to characteristics of the machine vibration data.

7. The method of claim 6 wherein the step of displaying one or more secondary cursor images comprises displaying the one or more secondary cursor images such that the image characteristics of the one or more secondary cursor images vary based on the position of each secondary cursor image with respect to the position of the primary cursor image.

8. The method of claim 2 further comprising the step of displaying one or more secondary cursor images representing one or more substantially planar cursors on the display, wherein the one or more secondary cursor images are spaced apart from the primary cursor image in a pattern corresponding to input from a user.

9. The method of claim 2 further comprising the step of displaying a dialogue box that permits a user to input specific desired coordinates for the positioning of the primary cursor image along the displayed data.

10. A method of displaying machine vibration data that is indicative of vibration produced during transient operation of rotating equipment, the method comprising the steps of:
   a. receiving the machine vibration data at an electronic device having a display, the machine vibration data expressed in at least three dimensional units corresponding to vibration peak amplitude, vibration phase angle, and RPM of the rotating equipment;
   b. displaying an image corresponding to the machine vibration data on the display in a three-dimensional graph in which the vibration peak amplitude and vibration phase angle are depicted in a polar plot as a function of RPM of the rotating equipment during the transient operation, the three-dimensional graph including an RPM axis that is perpendicular to the polar plot; and
   c. displaying a plurality of semi-transparent cursor images representing substantially planar cursors on the display whereby the data behind the planar cursors in the three dimensional graph is partially obscured and partially visible.

11. The method of claim 10, further comprising the step of moving at least one of the planar cursors on the display in response to user inputs to intersect the machine vibration data at one or more desired locations along the displayed data.

12. The method of claim 10, further comprising the step of outputting information corresponding to the machine vibration data at the intersection of at least two of the planar cursors and the machine vibration data.

13. A method of displaying transient vibration data on a display device for visual analysis, the method comprising:
   (a) recording vibration data indicative of vibration produced by rotating equipment over a period of time during a transient event;
   (b) processing the vibration data to determine vibration amplitude as a function of vibration frequency as a function of time during the period of time;
   (c) displaying a three-dimensional graph on the display device, wherein a first axis of the three-dimensional graph corresponds to the vibration amplitude, a second axis of the three-dimensional graph corresponds to the vibration frequency, and a third axis of the three-dimensional graph corresponds to the time during the transient event;
   (d) displaying a planar cursor in the three-dimensional graph on the display device, the planar cursor disposed parallel to two of the axes and perpendicular to one of the axes; and
   (e) displaying a data set indicator that follows a contour of the vibration amplitude versus frequency data and intersects the planar cursor.

14. The method of claim 13 further comprising displaying a cursor line that coincides with the planar cursor and intersects the data set indicator, the cursor line for indicating an intersection point of the planar cursor and the data set indicator.

15. The method of claim 13 wherein step (d) comprises displaying the planar cursor disposed parallel to the first and third axes and perpendicular to the second axis.

* * * * *